(12) United States Patent
Hiller et al.

(10) Patent No.: US 12,726,272 B2
(45) Date of Patent: Sep. 1, 2026

(54) LASER SCANNING FOR SPATIAL ACQUISITION OF A SATELLITE RECEIVER

(71) Applicant: The Boeing Company, Arlington, VA (US)

(72) Inventors: Nathan D. Hiller, Irvine, CA (US); Stephen Lambert, Maryland Heights, MO (US); Todd Harding Tomkinson, Newbury Park, CA (US); Steven Fulton Griffin, Kihei, HI (US)

(73) Assignee: The Boeing Company, Arlington, VA (US)

( * ) Notice: Subject to any disclaimer, the term of this patent is extended or adjusted under 35 U.S.C. 154(b) by 205 days.

(21) Appl. No.: 18/442,914

(22) Filed: Feb. 15, 2024

(65) Prior Publication Data

US 2025/0266907 A1 Aug. 21, 2025

(51) Int. Cl.

| | |
|---|---|
| ***H04B 10/118*** | (2013.01) |
| ***H04B 10/112*** | (2013.01) |
| ***H04B 10/50*** | (2013.01) |

(52) U.S. Cl.

CPC ....... *H04B 10/118* (2013.01); *H04B 10/1129* (2013.01); *H04B 10/503* (2013.01)

(58) Field of Classification Search

CPC .... H04B 10/112; H04B 10/118; H04B 10/50; H04B 1/02; H04B 1/06; H04B 1/03;

(Continued)

(56) References Cited

U.S. PATENT DOCUMENTS 4,279,036 A * 7/1981 Pfund .................... H04B 7/185 250/203.1
4,359,640 A 11/1982 Geiger (Continued)

FOREIGN PATENT DOCUMENTS

CN 108347279 A 7/2018
CN 113489540 A 10/2021

(Continued)

OTHER PUBLICATIONS

Simon Kim et al., "Analysis of Space Debris Orbit Prediction Using Angle and Laser Ranging Data from Two Tracking Sites under Limited Observation Environment," Mar. 31, 2020, Sensor,2020, 20, 1950,pp. 1-13.*

(Continued)

*Primary Examiner* — Omar S Ismail
(74) *Attorney, Agent, or Firm* — Yee & Associates, Inc.

(57) ABSTRACT

A laser beam transmission system comprises a laser beam system and a controller that controls the laser beam system. The controller is configured to direct a laser beam at a location nearest to a maximum of an uncertainty area in which a satellite is expected to be located. The controller is configured to move the laser beam from the location to a next location nearest to the maximum of the uncertainty area in response to not receiving a confirmation that the satellite is at the location. The next location becomes a current location for the laser beam. The controller is configured to continue to move the laser beam from the current location to the next location nearest to the maximum of the uncertainty area from the current location in response to not receiving the confirmation that the satellite has received the laser beam.

23 Claims, 14 Drawing Sheets

(58) Field of Classification Search
CPC ... H04B 1/10; H04B 1/16; H04B 1/38; H04B 1/3816; H04B 1/3827; H04B 1/40; H04B 1/62; H04B 1/707; H04B 1/713; H04B 1/7163; H04B 1/69; H04B 3/02; H04B 3/54; H04B 5/20; H04B 5/40; H04B 5/70; H04B 7/02; H04B 7/022; H04B 7/04; H04B 7/15; H04B 7/14; H04B 7/24; H04B 10/03; H04B 10/07; H04B 10/11; H04B 10/25; H04B 10/2507; H04B 10/27; H04B 10/291; H04B 10/29; H04B 10/40; H04B 10/60; H04B 10/80; H04B 10/516; H04B 10/58; H04B 10/61; H04B 10/66; H04B 14/02; H04B 15/02; H04B 17/10; H04B 17/20; H04B 17/30
See application file for complete search history.

(56) References Cited

U.S. PATENT DOCUMENTS 4,836,672 A 6/1989 Naiman et al.
5,216,477 A 6/1993 Korb
5,465,142 A 11/1995 Krumes et al.
6,839,520 B1 1/2005 Dreischer et al.
8,693,947 B2 4/2014 Silny et al.
11,488,046 B2 11/2022 McCormick
11,522,607 B2 12/2022 Boroson et al.
11,799,548 B2 10/2023 McCormick
12,025,982 B2 7/2024 Ray et al.
12,505,753 B2 * 12/2025 Hiller ........................ G08G 5/80
2001/0012142 A1 * 8/2001 Carlson ................ H04B 10/118 398/121
2005/0158059 A1 7/2005 Vaananen
2005/0180753 A1 * 8/2005 Wirth ..................... G02B 26/06 398/118
2005/0238356 A1 * 10/2005 Gilbert .................. H04L 9/0852 398/118
2006/0024061 A1 * 2/2006 Wirth ................. H04B 10/1125 398/129
2006/0109573 A1 * 5/2006 Jackson ............... G02B 26/105 359/872
2007/0052950 A1 * 3/2007 Taylor ..................... G01S 17/86 356/622
2007/0058161 A1 * 3/2007 Nichols ................... G01S 19/46 342/357.29
2008/0158044 A1 * 7/2008 Talbot .................. G01C 15/004 342/54
2008/0247758 A1 * 10/2008 Nichols ................... G01S 19/11 342/357.29
2009/0030551 A1 * 1/2009 Hein .................... G05D 1/0246 340/541
2009/0222153 A1 * 9/2009 Johnson ................. B64G 1/281 701/13
2009/0324236 A1 * 12/2009 Wu ...................... H04B 10/118 398/122
2012/0039599 A1 * 2/2012 Von Schwake ........... G01S 3/42 398/25
2015/0106047 A1 * 4/2015 Lukashin ............. B64G 1/1021 702/104
2015/0125157 A1 * 5/2015 Chao .................... H04B 10/118 398/122
2015/0303646 A1 * 10/2015 Levy ....................... G01S 7/484 359/334
2016/0065308 A1 3/2016 Coleman et al.
2017/0026122 A1 * 1/2017 Everett ................ H04B 10/503
2017/0034250 A1 * 2/2017 Sobhani ................ H04W 84/06
2017/0205534 A1 * 7/2017 Prikryl ................. G05D 1/0278
2017/0302377 A1 * 10/2017 Boroson ............ H04B 10/5161
2017/0366264 A1 * 12/2017 Riesing ................ H04B 10/615
2019/0025423 A1 * 1/2019 Sajwaj .................... E03B 7/003
2019/0154439 A1 5/2019 Binder
2019/0291720 A1 * 9/2019 Xiao ...................... G06V 10/82
2019/0372669 A1 12/2019 Ziegler et al.
2020/0005656 A1 1/2020 Saunamaeki
2020/0007232 A1 1/2020 Cahoy et al.
2020/0207389 A1 7/2020 Moth et al.
2020/0209394 A1 7/2020 Mark et al.
2020/0277087 A1 * 9/2020 Kaen ...................... B64G 1/242
2020/0341117 A1 * 10/2020 Sandford ................ G01S 17/93
2020/0389232 A1 12/2020 Danesh et al.
2021/0112647 A1 4/2021 Coleman
2021/0162912 A1 6/2021 Spero
2021/0293659 A1 9/2021 Ray et al.
2021/0372793 A1 * 12/2021 Nikulin .................. G01S 19/40
2021/0396888 A1 12/2021 McCormick
2022/0026195 A1 * 1/2022 Fertig .................... H04B 10/29
2022/0155452 A1 * 5/2022 Rawat ..................... G01S 17/88
2023/0040954 A1 * 2/2023 Hayashi ................... B64G 1/28
2023/0057677 A1 2/2023 Beuschel et al.
2023/0421244 A1 * 12/2023 Tsunemachi ....... H04B 7/18513
2024/0171275 A1 * 5/2024 Iqbal .................... H04B 10/112
2025/0070875 A1 * 2/2025 Sonoda ................ H04B 10/118
2025/0266908 A1 8/2025 Hiller

FOREIGN PATENT DOCUMENTS

CN 116886178 A 10/2023
CN 118131181 A 6/2024
JP H1065620 A 3/1998
KR 20230131378 A 9/2023
KR 102689477 B1 7/2024
WO 2016097832 A1 6/2016
WO 2018110788 A1 6/2018

OTHER PUBLICATIONS

Yunjie Teng et al.,"The Optimization Design of Sub-Regions Scanning and Vibration Analysis for Beaconless Spatial Acquisition in the Inter-Satellite Laser Communication System," Dec. 13, 2018,IEEE Photonica Journal,vol. 10,No. 6,Dec. 2018,pp. 1-6.*

Xin Li et al.,"Analytical expression and optimization of spatial acquisition for intersatellite optical communications," Jan. 25, 2011, Optics Express,vol. 19, No. 3,Jan. 31, 2011,pp. 1-7.*

Bing Jia et al., "Improved Target Laser Capture Technology for Hexagonal Honeycomb Scanning," May 6, 2023,photonics,2023, 10, 541,pp. 1-13.*

Keith E. wilson et al., "Development of Laser Beam Transmission Strategies for Future Ground-to-Space Optical Communications," May 4, 2007,Proc. of SPIE vol. 6551,pp. 65510B-1-65510B-12.*

W. A. Coles et al.,"A Radio System for Avoiding Illuminating Aircraft with a Laser Beam," Jan. 6, 2012, Publications of the Astronomical Society of the Pacific, 124:42-50, Jan. 2012,pp. 42-48.*

Morio Toyoshima et al., "Optimum divergence angle of a Gaussian beam wave in the presence of random jitter in free-space laser communication systems," Aug. 24, 2001, J. Opt. Soc. Am. A,Mar. 2002, vol. 19, No. 3, pp. 567-570.*

Yunjie Teng et al., "The Optimization Design of Sub-Regions Scanning and Vibration Analysis for Beaconless Spatial Acquisition in the Inter-Satellite Laser Communication System," Dec. 13, 2018, IEEE Photonics Journal, vol. 10, No. 6, Dec. 2018, pp. 2-10.*

Dominicus, Jacco. "New generation of counter UAS systems to defeat of low slow and small (LSS) air threats." (Year: 2021).

Hu, S. G., et al. "Efficiency analysis of intercepting UAV swarm by various air defense methods." Journal of Physics: Conference Series. vol. 2472. No. 1. IOP Publishing, (Year: 2023).

Liao, Longwen, Xiaoliang Huang, and Fengyu Xie. "Development status and operation analysis of laser weapon in anti-drone warfare." 2023 IEEE International Conference on Unmanned Systems (ICUS). IEEE, (Year: 2023).

Office Action, dated Jul. 30, 2025, regarding U.S. Appl. No. 18/442,984, 20 pages.

Bloom et al., Understanding the performance of free-space optics [Invited], Journal of Optical Networking, Jun. 2003, vol. 2, Issue 6, pp. 178-200.

Jia et al., "Improved Target Laser Capture Technology for Hexagonal Honeycomb Scanning," Photonics 2023, May 6, 2023, pp. 1-17,

(56) References Cited

OTHER PUBLICATIONS vol. 10, Issue. 5, MDPI, Basel, Switzerland, accessed Dec. 22, 2023, https://www.mdpi.com/2304-6732/10/5/541.
Li et al., Analytical expression and optimization of spatial acquisition for intersatellite optical communications, Optics Express, Jan. 31, 2011, vol. 19, Issue 3, pp. 2381-2390.
Runkel, et al., "An Overview of Raster Scanning for ICF-Class Laser Optics," Boulder Damage Symposium XXXIV: Annual Symposium on Optical materials for High Power Lasers, Oct. 30, 2002, 13 pages, U.S. Department of Energy, accessed Dec. 27, 2023, https://www.osti.gov/servlets/purl/15004028.
Toyoshima et al., Optimum divergence angle of a Gaussian beam wave in the presence of random jitter in free-space laser communication systems, Journal of the Optical Society of America A, Mar. 2002, vol. 19, Issue 3, pp. 567-571.
Hiller et al., "Laser Beam Based Flight Path Clearing System," U.S. Appl. No. 18/442,984, filed Feb. 15, 2024, 49 pages.
Hiller et al., "Laser Sensor System With Pattern Scanning," U.S. Appl. No. 18/442,953, filed Feb. 15, 2024, 51 pages.
Edstrom, Marten. "Laser Power Beaming for in-Flight Charging of Unmanned Aerial Vehicles—a Viability Study." (2025).
Kiehn, Daniel, et al. "Adaptive Wind Field Estimation Using an Empirical Bayesian Approach." Journal of Guidance, Control, and Dynamics 47.11 (2024): 2386-2396. (Year: 2024).
Notice of Allowance, dated Sep. 11, 2025, regarding U.S. Appl. No. 18/442,984, 8 pages.
Satat, Guy, Matthew Tancik, and Ramesh Raskar. "Towards photography through realistic fog." 2018 IEEE International Conference on Computational Photography (ICCP). IEEE, 2018. (Year: 2018).
Zheng, Jianhua, et al. "Review on Security Range Perception Methods and Path-Planning Techniques for Substation Mobile Robots" Energies 17.16 (2024): 4106. (Year: 2024).
Notice of Allowance, dated Jul. 7, 2026, regarding U.S. Appl. No. 18/829,853, 22 pages.
Office Action, dated Jun. 2, 2026, regarding U.S. Appl. No. 18/829,853, 65 pages.
Office Action, dated Jun. 5, 2026, regarding U.S. Appl. No. 18/442,953, 56 pages.

* cited by examiner

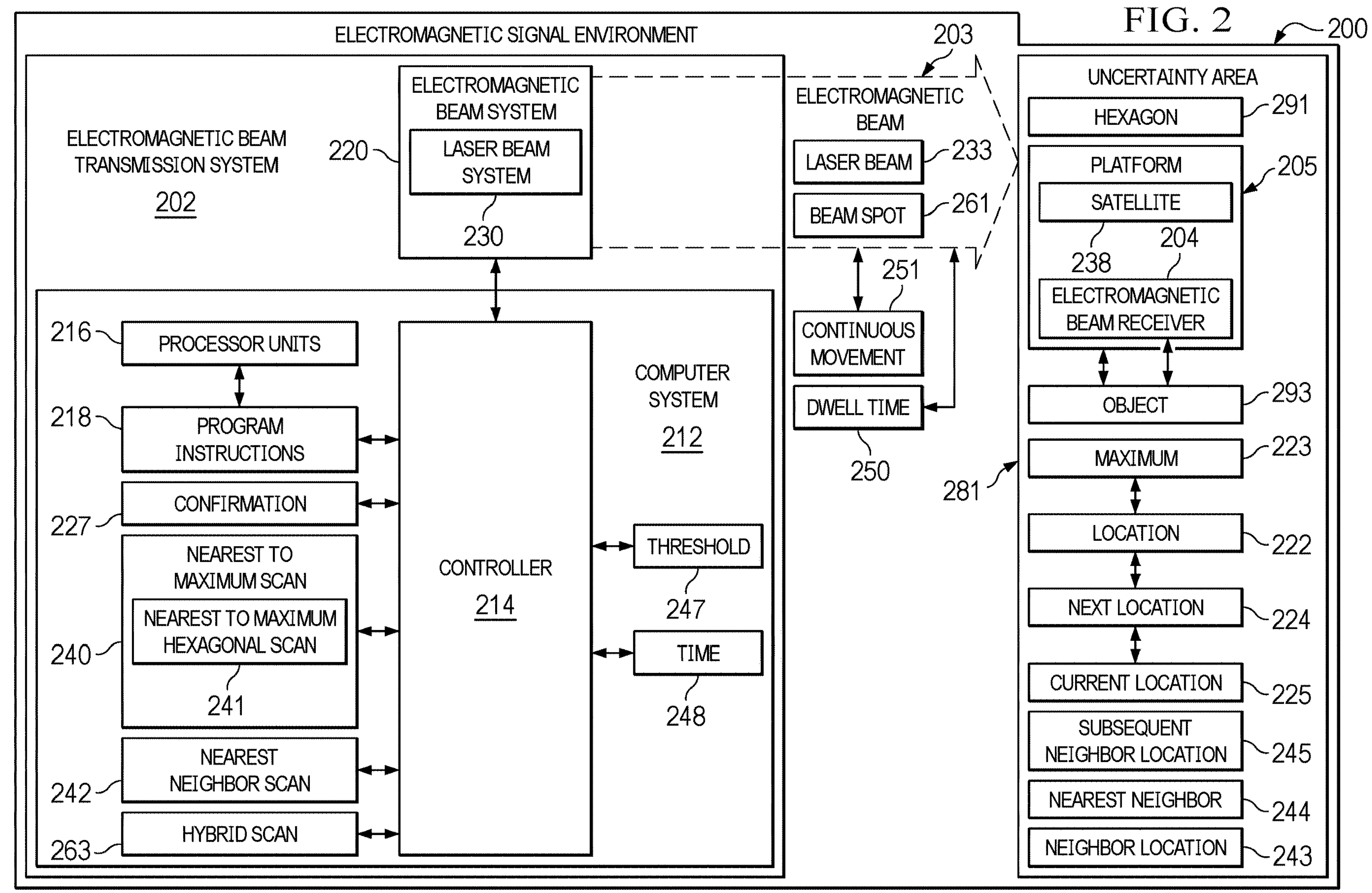
FIG. 2
200
ELECTROMAGNETIC SIGNAL ENVIRONMENT
ELECTROMAGNETIC BEAM TRANSMISSION SYSTEM
202
ELECTROMAGNETIC BEAM SYSTEM
220
LASER BEAM SYSTEM
230
ELECTROMAGNETIC BEAM
203
LASER BEAM
233
BEAM SPOT
261
CONTINUOUS MOVEMENT
251
DWELL TIME
250
UNCERTAINTY AREA
281
HEXAGON
291
PLATFORM
205
SATELLITE
238
ELECTROMAGNETIC BEAM RECEIVER
204
OBJECT
293
MAXIMUM
223
LOCATION
222
NEXT LOCATION
224
CURRENT LOCATION
225
SUBSEQUENT NEIGHBOR LOCATION
245
NEAREST NEIGHBOR
244
NEIGHBOR LOCATION
243
COMPUTER SYSTEM
212
PROCESSOR UNITS
216
PROGRAM INSTRUCTIONS
218
CONFIRMATION
227
NEAREST TO MAXIMUM SCAN
240
NEAREST TO MAXIMUM HEXAGONAL SCAN
241
NEAREST NEIGHBOR SCAN
242
HYBRID SCAN
263
CONTROLLER
214
THRESHOLD
247
TIME
248

LASER SCANNING FOR SPATIAL ACQUISITION OF A SATELLITE RECEIVER

STATEMENT OF GOVERNMENT SUPPORT

This invention was made with Government support under DFARS 252.227-7038 awarded by the Department of Defense. The government has certain rights in this invention.

CROSS-REFERENCE TO RELATED APPLICATIONS

This application is related to U.S. Patent Application entitled "Laser Sensor System With Pattern Scanning," Ser. No. 18/442,953, and U.S. Patent Application entitled "Laser Beam Based Flight Path Clearing System," Ser. No. 18/442,984, both of which were filed on Feb. 15, 2024, assigned to the same assignee, and incorporated herein by reference in their entirety.

BACKGROUND INFORMATION

1. Field

The present disclosure relates generally to communications using electromagnetic signals and in particular, to a method, apparatus, and system for directing electromagnetic beam transmitters at receivers and pointing receivers at electromagnetic signal sources.

2. Background

Satellites can send information to each other using laser beams. With satellite communications, data can be transmitted as laser beams that are encoded with information. The laser beams can carry digital data in the form of on-and-off patterns when laser beam pulses are used. In other cases, the intensity or phase of laser beams can be changed to encode data.

In establishing satellite communications between two satellites, a laser beam is transmitted from one satellite to another satellite to establish a communications link. Establishing the communications link involves one satellite directing a laser beam at another satellite. This pointing of the laser beam is over great distances and requires precision to properly point the laser beam to establish the communications link.

SUMMARY

An example of the present disclosure provides a laser beam transmission system comprising a laser beam system configured to transmit a laser beam and a controller. The controller is configured to control the laser beam transmission system to direct the laser beam at a location nearest to a maximum of an uncertainty area in which a satellite is expected to be located. The controller is configured to control the laser beam transmission system to move the laser beam from the location to a next location nearest to the maximum of the uncertainty area in response to not receiving a confirmation that the satellite is at the location. The next location becomes a current location for the laser beam. The controller is configured to control the laser beam transmission system to continue to move the laser beam from the current location to the next location nearest to the maximum of the uncertainty area from the current location in response to not receiving the confirmation that the satellite has received the laser beam.

Another example of the present disclosure provides an electromagnetic beam transmission system comprising an electromagnetic beam system configured to transmit an electromagnetic beam and a controller. The controller is configured to control the electromagnetic beam transmission system to direct the electromagnetic beam at a location nearest to a maximum of an uncertainty area in which an object is expected to be located. The controller is configured to control the electromagnetic beam transmission system to move the electromagnetic beam from the location to a next location nearest to the maximum of the uncertainty area in response to not receiving a confirmation that the object is at the location. The next location becomes a current location for the electromagnetic beam. The controller is configured to control the electromagnetic beam transmission system to continue to move the electromagnetic beam from the current location to the next location nearest to the maximum of the uncertainty area from the current location in response to not receiving the confirmation that the electromagnetic beam has encountered the object.

Yet another example of the present disclosure provides an electromagnetic beam transmission system comprising an electromagnetic beam system configured to transmit an electromagnetic beam and a controller. The controller is configured to control the electromagnetic beam transmission system to direct the electromagnetic beam to a location in an uncertainty area using a scan metric. The uncertainty area is an area in which an object is expected to be located. The controller is configured to control the electromagnetic beam transmission system to move the electromagnetic beam from the location to a next location using the scan metric in response to not receiving a confirmation that the object is at the location. The next location becomes a current location for the electromagnetic beam. The controller is configured to control the electromagnetic beam transmission system to continue to move the electromagnetic beam from the current location to the next location using the scan metric in response to not receiving the confirmation that the electromagnetic beam has encountered the object.

Still another example of the present disclosure provides a method for pointing a laser beam. The laser beam is directed at a location nearest to a maximum of an uncertainty area in which a satellite is expected to be located. The laser beam is moved from the location to a next location nearest to the maximum of the uncertainty area in response to not receiving a confirmation that the satellite is at the location. The next location becomes a current location for the laser beam. The laser beam continues to be moved from the current location to the next location nearest to the maximum of the uncertainty area from the current location in response to not receiving the confirmation that the satellite has received the laser beam.

Still another example of the present disclosure provides a method for pointing an electromagnetic beam. The electromagnetic beam is directed at a location nearest to a maximum of an uncertainty area in which an object is expected to be located. The electromagnetic beam is moved from the location to a next location nearest to the maximum of the uncertainty area in response to not receiving a confirmation that the object is at the location. The next location becomes a current location for the electromagnetic beam. The electromagnetic beam continues to be from the current location to the next location nearest to the maximum of the uncertainty area from the current location in response to not receiving the confirmation that the electromagnetic beam has encountered the object.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 2 is an illustration of a block diagram of an electromagnetic signal environment in accordance with an illustrative example;

DETAILED DESCRIPTION

Figure 1:
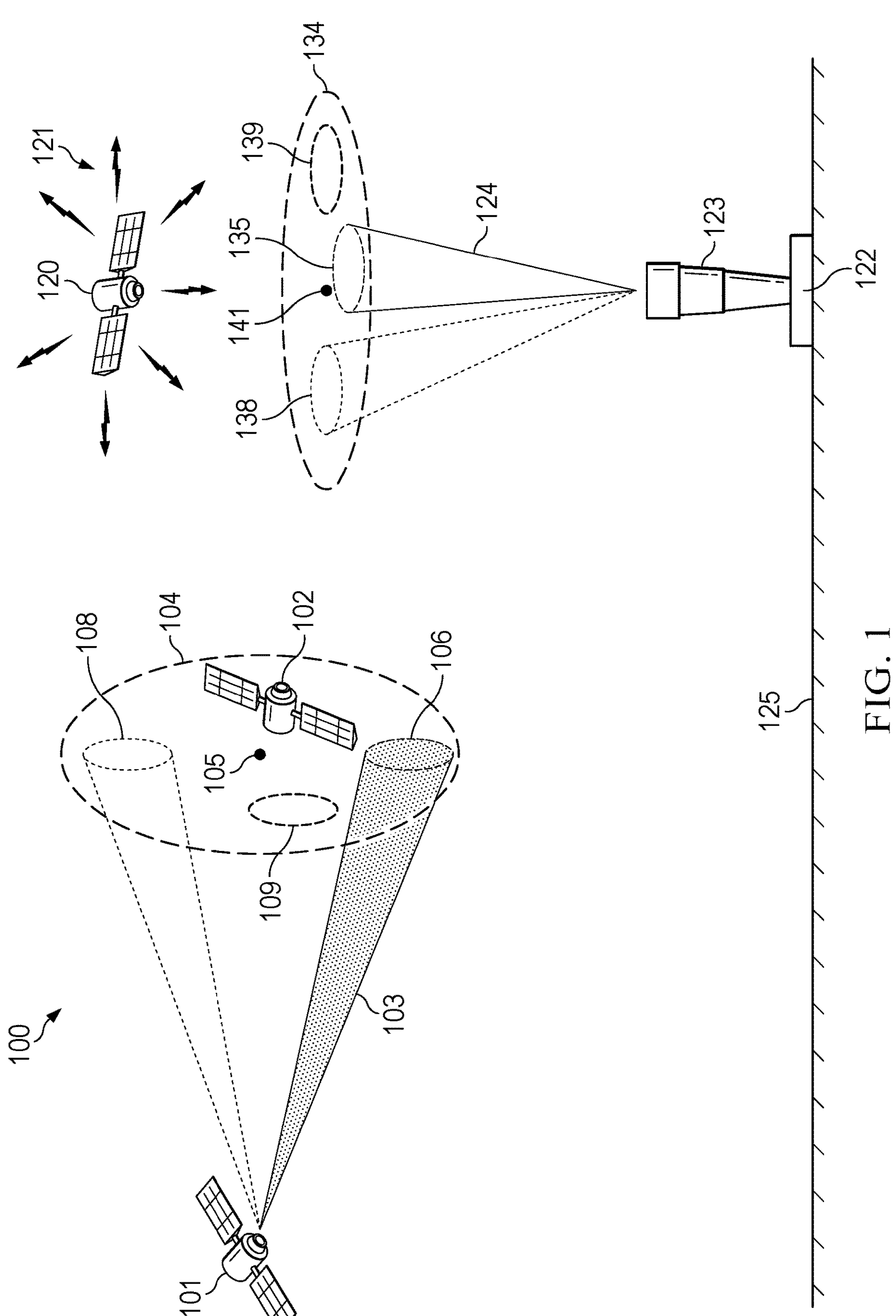
FIG. 1 is a pictorial illustration of a satellite communications environment in which illustrative examples may be implemented.

The illustrative examples recognize and take into account one or more different considerations as described herein. During the initial acquisition in establishing the communications link, a time efficient scanning method for pointing laser beams at satellites is desired. Various scanning methods can be used to point a laser beam from a transmitting satellite to a receiving satellite. In satellite communications, lasers beams can different wavelengths such as, for example, a wavelength of about 1064 nm in the near infrared wavelength range, 1550 nm in the visible wavelength range, and 532 in the visible wavelength range. Current laser scanning methods include a continuous spiral scan, a step spiral scan, a segment scan, and a raster scan. These types of scans for establishing the communications link may not be fast enough to meet various requirements.

In one illustrative example, rather than simply scanning a laser beam from location to location, the laser beam can be moved between points in a step-like fashion using a pattern that is the most efficient packing density for the area being scanned.

Further, one illustrative example takes advantage of the Gaussian probability distribution of the satellite location in the area. For example, the laser beam can be moved to a location nearest to the maximum of the uncertainty area using the Gaussian probability distribution. This type of movement can result in skipping locations in the beam pattern in contrast to the current scanning techniques that move the laser beam from one location to another location. This type of movement of the laser beam can be more difficult than moving to neighboring locations.

For example, a laser beam transmission system comprises a laser beam system configured to transmit a laser beam and a controller. The controller can be configured to control the laser beam transmission system to direct the laser beam at a location nearest to a center of an area in which the satellite is expected to be located. The controller can be configured to control the laser beam transmission system to move the laser beam from the location to a next location nearest to the maximum of the uncertainty area in response to not receiving a confirmation that the satellite is at the location, wherein the next location becomes a current location for the laser beam. The controller can be configured to control the laser beam transmission system to continue to move the laser beam from the current location to the next location nearest to the maximum of the uncertainty area from the current location in response to not receiving the confirmation that the satellite has received the laser beam.

In another illustrative example, the laser beam changes from moving the laser beam from the current location to the next location nearest to the maximum of the uncertainty area to moving the laser beam to neighboring locations at the cost of not fully taking advantage of the Gaussian distribution of the satellite in the uncertainty area. This type of movement of the laser beam to the nearest neighbor location can be used when moving the laser beam to the next location that is nearest to the maximum of the uncertainty area being scanned takes more time than moving the laser into the neighboring location or is greater than some other threshold. As a result, a hybrid scan can be performed in the illustrative example.

For example, the controller is configured to control the laser beam system to move the laser beam to a neighbor location of a nearest neighbor in response to a time for moving the laser beam from the current location to the next location using the location nearest to the maximum of the uncertainty area being greater than a threshold. The controller is configured to control the laser beam system to continue to move the laser beam from the current location to a subsequent neighbor location of the nearest neighbor from the current location in response to a time for moving the laser beam from the current location to the next location using the location nearest to the maximum of the uncertainty area being greater than the threshold and in response to not receiving a confirmation that the satellite has received the laser beam.

With reference now to the figures and, in particular, with reference to FIG. 1, a pictorial illustration of a satellite communications environment is depicted in which illustrative examples may be implemented. As depicted, satellite communications environment 100 is an environment in which electromagnetic signals can be transmitted for satellite communications.

For example, satellite 101 transmits laser beam 103 to satellite 102 to establish a communications link with satellite 102. With the establishment of a communications link, satellite 101 and satellite 102 can communicate information using laser beams. The transmission data using laser beams can be unidirectional from satellite 101 to satellite 102 or from satellite 102 to satellite 101. In another example, the communication of data using laser beams can be bidirectional between satellite 101 and satellite 102.

In this illustrative example, satellite 102 is expected to be located somewhere in area 104. In this example, area 134 is an area in satellite 134 can be located. This area can be determined based on an estimated location of satellite 134. This estimate has uncertainty that can also be used to determine area 134. The uncertainty in the location of a satellite can be a range of possible positions wherein the satellite may be located. For example, the location uncertainty for a satellite is a result of the satellite navigation system's attitude and ephemeris uncertainties (~hundreds of mrad), which are expressed as azimuth and elevation uncertainties. The probability distribution function for satellite position can be described by a Gaussian distribution for both azimuth and elevation uncertainties.

In this illustrative example, the laser beam 103 is transmitted at locations in area 104 using a pattern that provides for a faster locating of satellite 102 as compared to current scanning techniques.

In one illustrative example, satellite 101 transmits laser beam 103 from location 106 to location 108 within area 104. In this example, selecting location 108 after directing laser beam 103 at location 106 is made by selecting the location that is nearest to maximum 105 of area 104 in which satellite 102 is expected to be located. Location 108 is a location that has not yet been selected for transmitting laser beam 103. In this illustrative example, the next location is not necessarily the nearest neighbor to location 106.

This type of movement of laser beam 103 can continue until satellite 102 is located. In this illustrative example, a confirmation can be received from satellite 102 or some other source that laser beam 103 is directed at satellite 102 in a manner such that communications can be established.

Additionally, if the amount of time from location 106 to the next location, location 108, that is nearest to maximum 105 of area 104 is greater than some threshold, then satellite 101 can direct laser beam 103 to the next nearest neighbor from location 106. In this example, the next nearest neighbor to location 106 is location 109. This change provides for hybrid scanning that also enables finding the location of satellite 102 within area 104 more quickly as compared to current techniques.

Further, within satellite communications environment 100, satellite 120 broadcasts information in electromagnetic signals 121 that can be received by receiver 122. Electromagnetic signals 121 can be at least one of the electric or magnetic fields that carrier information. At least one of amplitude, frequency, or face can modulated to encode information in electromagnetic signals 121. In this illustrative example, telescope 123 is a component for receiver 122. As depicted in this example, these components are located on ground 125.

Telescope 123 is a physical device that can be used to transmit and receive signals. For example, telescope 123 includes optics and other components that can be used to collect and focus incoming electromagnetic signals such as light waves or radio waves.

In this illustrative example, satellite 120 is expected to be within area 134.

Telescope 123 has field of view (FOV) 124 that can be pointed at different locations in area 134. In other words, telescope 123 has optics for other components that define field of view 124.

Field of view 124 for telescope 123 can be pointed at location 135 in area 134. The selection of location 135 is based on a location nearest to maximum 141 of area 134.

Field of view 124 can be moved from location 135 to location 138 within area 134. As with transmitting laser beam 103, the movement of field of view 124 may be to another location if the next location nearest to maximum 141 of area 134 in which satellite 120 is expected to be located. In this example, the next location is location 138, which is not the nearest neighbor to location 135.

This movement of the field of view 124 can continue to occur until receiver 122 detects electromagnetic signals 121 from satellite 120. In other illustrative examples, this process can be halted when some threshold amount of time occurs without detecting electromagnetic signals 121 or if the entire area is searched without detecting electromagnetic signals 121. Directional amount of time can be user set in one illustrative example.

In this illustrative example, electromagnetic signals 121 may be considered to be detected when receiver 122 is able to extract for identifying information within electromagnetic signals 121. In another example, electromagnetic signals 121 can be considered to be detected when electromagnetic signals above a noise level are detected.

If the amount of time to move field of view 124 from location 135 to the next location is greater than some threshold, then field of view 124 can be moved to the next nearest neighbor from location 136, such as location 139. The next location is location 138 that is nearest to maximum 141 of area 134 in this example. This threshold can be, for example, thematic time to move the field of view from location to a neighboring or adjacent location. This change provides for hybrid scanning that also enables finding the location of satellite 102 within area 104 more quickly as compared to current techniques.

The illustration of satellite communications environment 100 is provided as one example and is not meant to limit the manner in which other illustrative examples can be implemented. Although the areas are shown as circular, the areas in which the satellites can be located can take other shapes. For example, the areas can be elliptical, hexagonal, or some other shape in the different examples. These areas can also be referred to as uncertainty areas in which a satellite or other object may be located.

In another illustrative example, laser beam 103 can take another form. For example, a microwave beam can be used in place of laser beam 103.

In yet another illustrative example, receiver 122 and telescope 123 can be located in another location other than on ground 125. For example, receiver 122 and telescope 123 can be located on a platform such as a vehicle, a ship, an aircraft, a building, or some other suitable location.

With reference now to FIG. 2, an illustration of a block diagram of an electromagnetic signal environment is depicted in accordance with an illustrative example. In this illustrative example, electromagnetic signal environment 200 includes components that can be implemented in hardware such as the hardware in satellite 101 and satellite 102 in FIG. 1.

In this illustrative example, electromagnetic beam transmission system 202 can point the transmission of electromagnetic beam 203 at object 293. In this example, object 293 can be electromagnetic beam receiver 204. Object 293 can also be platform 205 with which electromagnetic beam receiver 204 is connected in this example.

In this illustrative example, electromagnetic beam transmission system 202 comprises electromagnetic beam system 220 and controller 214. In this example, controller 214 is located in computer system 212. As depicted, computer system 212 is also part of electromagnetic beam transmission system 202.

Electromagnetic beam system 220 is a physical hardware system. This hardware system is configured to transmit electromagnetic beam 203.

Controller 214 can be implemented in software, hardware, firmware, or a combination thereof. When software is used, the operations performed by controller 214 can be implemented in program instructions configured to run on hardware, such as a processor unit. When firmware is used, the operations performed by controller 214 can be implemented in program instructions and data can be stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 controls electromagnetic beam transmission system 202 to direct electromagnetic beam 203 at location 222 nearest to maximum 223 of uncertainty area 281 in which object 293 is expected to be located. In other words, uncertainty area 281 is an area in which object 293 is thought to be present. However, object 293 may not actually be in uncertainty area 281. In some cases, uncertainty area 281 can be selected as an area for searching with the hope of locating object 293.

Further in this example, maximum 223 represents a probability that object 293 is at a location (laser spot) covered by laser beam system 230. Maximum 223 does not need to be 100 percent but can be some lower percentage.

As depicted, electromagnetic beam 203 has beam spot 261. In this example, beam spot 261 is a diameter of electromagnetic beam 203 at a location in uncertainty area

281. In this example, beam spots can correspond to locations in uncertainty area 281. For example, location 222 in uncertainty area 281 can have a size and shape that corresponds to beam spot 261 when the electromagnetic beam 203 is directed at location 222.

In one illustrative example when object 193 is electromagnetic beam receiver 204, the size of beam spot 261 can affect the ability of electromagnetic beam receiver 204 to detect electromagnetic beam 203. For example, as the spot size of electromagnetic beam 203 increases the divergence of electromagnetic beam 203 increases. This increase results in a faster scan time to point to where electromagnetic beam receiver 204 is located. However, the increase in the size of beam spot 261 can have a divergence in electromagnetic beam 203 that results in an intensity of these signals being too weak for electromagnetic beam receiver 204 to detect.

In another example, as the size of beam spot 261 decreases, the divergence of electromagnetic beam 203 also decreases. With this lower level divergence, electromagnetic beam receiver 204 can more easily detect electromagnetic beam 203. However, the scan time to locate electromagnetic beam receiver 204 may become slower than desired.

In another example, the size of beam spot 261 can be set such that the divergence of electromagnetic beam 203 is such that electromagnetic beam 203 can be just barely detected by electromagnetic beam receiver 204. This type of divergence may result in locating electromagnetic beam receiver 204 in a time that is faster than current techniques such as techniques that scan from location to location in which the locations are adjacent to each other.

Location 222 nearest to maximum 223 of uncertainty area 281 can be determined using a probability density function (PDF) that shows what location is likely to be closest to maximum 223. The probability density function can be used to identify the probability that an object is present in a particular location in an area. The probabilities for the location of an object can be generated using the probability density function with the expected location for the object. The probability density function can also be referred to as a type of probability distribution function. The probability density function can be, for example, a Gaussian function, analytical distribution, a skewed distribution, or other type of probability density function.

For example, the location uncertainty for the receiving satellite is a result of the satellite navigation system's attitude and ephemeris uncertainties (~hundreds of mrad), which are expressed as azimuth and elevation uncertainties. The probability distribution function for satellite position can be described by a Gaussian distribution for both azimuth and elevation uncertainties using currently known techniques.

Thus, information can be identified as to the expected location of a satellite based on the satellite orbit information. This expected location may not be the actual location of the satellite. As result, the probabilities that an object is present in different locations within the area of interest can be determined and used for scanning for the object.

In this example, the area of interest is uncertainty area 281. Maximum 223 is the peak of the probability density function when the probability density function has a single peak.

In this example, controller 214 controls electromagnetic beam system 220 to move electromagnetic beam 203 from location 222 to next location 224 nearest to maximum 223 of uncertainty area 281 in response to not receiving confirmation 227 that object 293 such as electromagnetic beam receiver 204 is at location 222. In this example, next location 224 becomes current location 225 for electromagnetic beam 203.

Controller 214 controls electromagnetic beam system 220 to continue to move electromagnetic beam 203 from current location 225 to next location 224 nearest to maximum 223 of uncertainty area 281 from current location 225 in response to not receiving a confirmation 227 that electromagnetic beam 203 has encountered object 293, such as electromagnetic beam receiver 204 receiving electromagnetic beam 203. This type of movement of electromagnetic beam 203 is nearest to maximum scan 240.

In this illustrative example, confirmation 227 can take a number of different forms. For example, confirmation 227 can be a reply or acknowledgment sent in a return electromagnetic beam to electromagnetic beam system 220. In this example, electromagnetic beam system 220 can also receive electromagnetic beams. In another illustrative example, confirmation can be sent through another transmission to controller 214 through another device such as a radiofrequency receiver or other type of receiver.

In one illustrative example, electromagnetic beam 203 can take the form of laser beam 233. Further, laser beam 233 can be selected from a group comprising a continuous laser beam and a pulsed laser beam. Electromagnetic beam system 220 can be laser beam system 230 and platform 205 can take the form of satellite 238.

In this example, controller 214 controls laser beam system 230 to direct laser beam 233 at location 222 nearest to maximum 223 of uncertainty area 281 in which satellite 238 is expected to be located. Controller 214 also controls laser beam system 230 to move laser beam 233 from location 222 to next location 224 nearest to maximum 223 of uncertainty area 234 in response to not receiving confirmation 227 that satellite 238 is at location 222. In this example, next location 224 becomes current location 225 for laser beam 233. Controller 214 controls laser beam system 230 to continue to move laser beam 233 from current location 225 to next location 224 nearest to maximum 223 of uncertainty area 281 from current location 225 in response to not receiving confirmation 227 that satellite 238 has received laser beam 233. The moving or directing of laser beam 233 can also be referred to as pointing laser beam 233. Further, laser beam 233 can be selected from one of unidirectional communications and bidirectional communications.

In continuing to continue to move laser beam 233, controller 214 can control laser beam system 232 to move laser beam 233 from current location 225 to next location 224 nearest to maximum 223 of uncertainty area 281 from current location 225 with dwell time 250 at each location in response to not receiving confirmation 227 that satellite 238 has received laser beam 233. In this example, dwell time 250 is the amount of time that laser beam 233 is pointed at a particular location in uncertainty area 281.

In another illustrative example, in continuing to move laser beam 233, controller 214 can control laser beam system 232 to move laser beam 233 from current location 225 to next location 224 nearest to maximum 223 of uncertainty area 281 from current location 225 with continuous movement 251 from one location to another location in response to not receiving confirmation 227 that satellite 238 has received laser beam 233. In this example, laser beam 233 moves from one location to another location without pausing or waiting. In other words, dwell time 250 is not present with this type of movement of laser beam 233.

In this example, confirmation 227 can be received from satellite 238. Satellite 238 sends a return laser beam at the same angle as the incoming laser beam 233.

In this example, the movement controlled by controller 214 is nearest to maximum scan 240 such as nearest to maximum hexagonal scan 241. With this example, uncertainty area 281 can be in a shape of hexagon 291. Further, controller 214 can control the movement of laser beam 233 to change from nearest to maximum scan 240 to nearest neighbor scan 242. This type of scan in which the scanning changes from nearest to maximum scan 240 to nearest neighbor scan 242 is referred to as hybrid scan 263.

For example, controller 214 moves laser beam 233 to neighbor location 243 of nearest neighbor 244 in response to time 248 for moving laser beam 233 from current location 225 to next location 224 using location 222 nearest to maximum 223 of uncertainty area 281 being greater than threshold 247. In this example, next location 224 becomes current location 225 for future movements.

In this case, threshold 247 can be selected as the time for moving laser beam 233 from one location to a neighboring location. In another illustrative example, the threshold can be a lower time or some other suitable time. A probability of detection (y-axis) vs. pulse power (x-axis) graph may have two peaks. For low pulse powers (i.e., x values close to zero), an exponentially decreasing curve occurs as pulse power increases. This portion of the curve is caused mostly by noise. At some higher pulse powers, a Gaussian profile occurs in the curve. This portion of the curve is dominated by a signal.

If the pulse power threshold is set very low (i.e., low values for x), noise is often detected, resulting in a high false alarm rate. If the pulse power threshold is set very high (i.e., high values for x), the signal is almost always detected. Signal pulses can be missed (i.e., probability of detection is very low). However, a pulse power threshold can be selected in between these two extremes that provides a reasonable high probability of detection while having a reasonably low false alarm rate.

For example, for a single pulse, if a probability of detection of >90% is desired, this probability may require setting a threshold 1.28 standard deviations below the mean (i.e., peak) of the Gaussian curve. If a probability of detection of >99.9% is desired, this probability may set a threshold 3.0 standard deviations below the mean (i.e., peak) of the Gaussian curve. The false alarm rate can depend on factors such as the nature of the noise source, which drives the exact shape and magnitude of the noise PDF curve.

Further in this example, controller 214 continues to move laser beam 233 from current location 225 to subsequent neighbor location 245 of nearest neighbor 244 from current location 225 in response to time 248 for moving laser beam 233 from current location to next location 224 using location 222 nearest to maximum 223 of uncertainty area 281 being greater than threshold 247 and in response to not receiving confirmation 227 that satellite 238 has received laser beam 233.

As a result, controller 214 changes from using nearest to maximum scan 240 to nearest neighbor scan 242. This type of hybrid scan can provide a faster location of satellite 238 as compared to just using nearest to maximum scan 240.

In moving laser beam 233 to neighbor location 243 of nearest neighbor 244 and continuing to move laser beam 233 from current location 225 to subsequent neighbor location 245 of nearest neighbor 244 from current location 225 is part of a nearest neighbor scan 242 selected from one of a continuous spiral scan, a step spiral scan, a segmented scan, and a raster scan.

In response to receiving confirmation 227, controller 214 establishes communications with satellite 238. The communication is selected from one of unidirectional communications and bidirectional communications.

In one illustrative example, one or more technical solutions are present that overcome a technical problem with pointing an electromagnetic beam, such as a laser, at a receiver. As a result, one or more illustrative examples enable pointing a laser beam at a receiver in an efficient manner. The pointing of the laser beam is performed in a manner that uses a nearest to maximum scan as opposed to a nearest neighbor scan.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables pointing an electromagnetic beam 203 at electromagnetic beam receiver 204 more quickly as compared to current techniques. Controller 214 transforms computer system 212 into a special purpose computer system as compared to currently available general computer systems that do not have controller 214.

In the illustrative example, the use of controller 214 in computer system 212 integrates processes into a practical application for pointing electromagnetic beam 203 at electromagnetic beam receiver 204. In these different examples, the processes identify locations to point electromagnetic beam 203 and control electromagnetic beam transmission system 202 to point electromagnetic beam 203 at the different locations as part of a process to locate electromagnetic beam receiver 204.

The illustration of electromagnetic signal environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic beam 203 has been described as being laser beam 233. Electromagnetic beam 203 can take other forms in other illustrative examples. For example, electromagnetic beam 203 can be selected from a group comprising laser beam 233, a radio frequency beam, a microwave beam, and other suitable types of electromagnetic signals that can be shaped into a beam.

As another example, platform 205 can take a number of different forms in addition to satellite 238. For example, electromagnetic beam receiver 204 can be located in platform 205 selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

As another example, uncertainty area 281 can take other shapes in addition to hexagon 291. For example, uncertainty area 281 can be a shape selected from a group comprising a circle, an octagon, an ellipse, or some other suitable shape. Controller 214 can control one or more electromagnetic beam systems in addition to or in place of electromagnetic beam system 220. Further, the system can be used with an electromagnetic signal receiver system as described below with respect to FIG. 3.

In another example, controller 214 in electromagnetic beam transmission system 202 can point electromagnetic beam 203 to different locations in an uncertainty area using other mechanisms other than the location nearest to a maximum of an uncertainty area.

For example, controller 214 can control the electromagnetic beam system 220 to direct electromagnetic beam 203 to a location in uncertainty area 131 using a scan metric. Uncertainty area 281 is an area in which object 293 is expected to be located although it is possible that object 293 may not be in uncertainty area 281.

Controller 214 can control electromagnetic beam system 220 to move electromagnetic beam 203 from location 222 to next location 224 using the scan metric in response to not receiving confirmation 227 that object 293 is at location 222. Next location 224 becomes current location 225 for electromagnetic beam 203. Controller 214 can control electromagnetic beam system 220 to continue to move the electromagnetic beam 203 from current location 225 to next location 224 using the scan metric in response to not receiving confirmation 227 that object 293 is at location 222.

Further in this example, controller 214 selects next location 224 in uncertainty area 281 from a set of candidate locations that has a highest value for the scan metric, wherein the scan metric is as follows:

$$M=PDF_{int}/t_{tot}$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from a current location to the next potential location, and $t_{dwell}$ is a time the line of site dwells at the next potential location.

Figure 3:
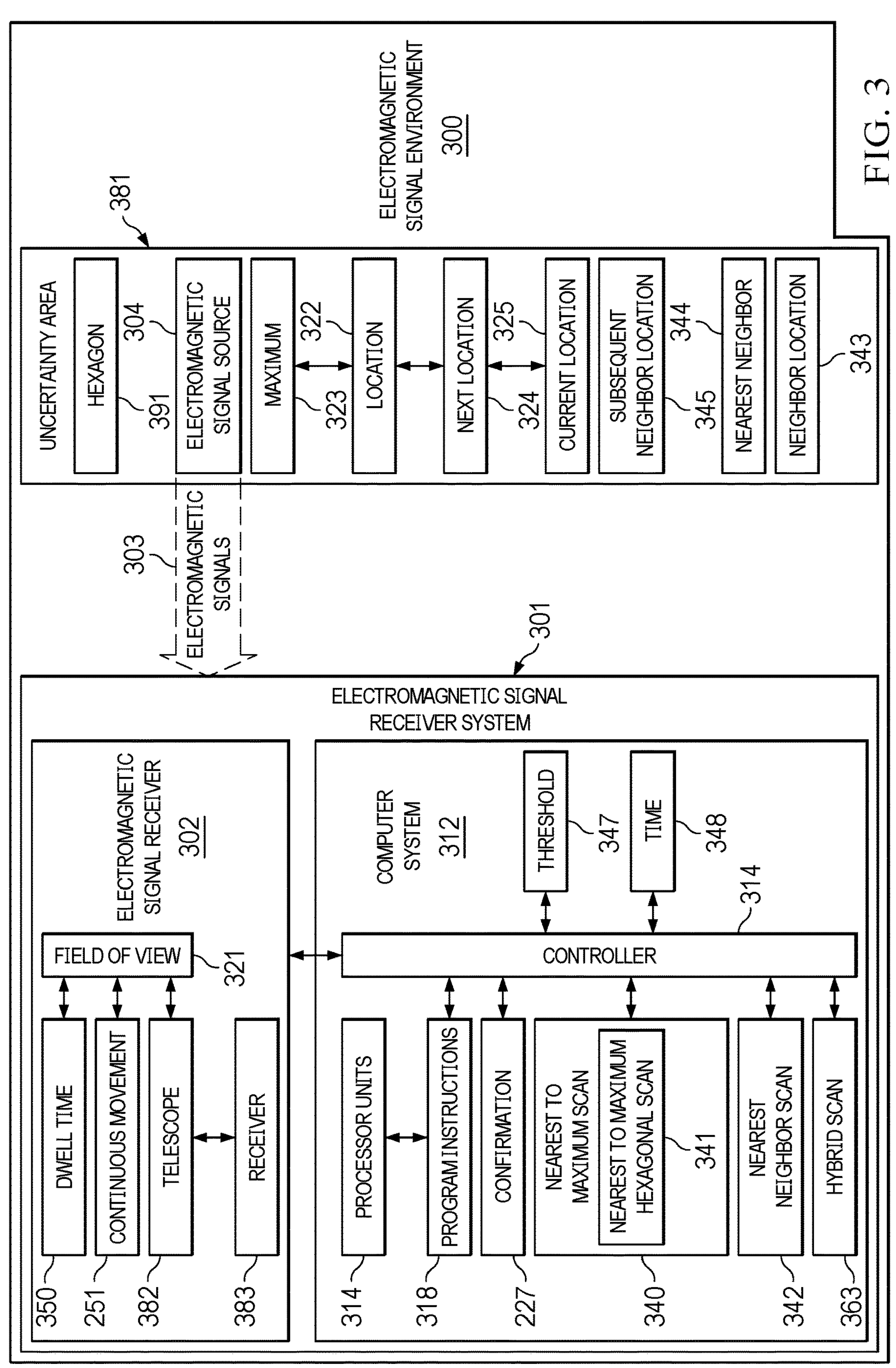
FIG. 3 is an illustration of a block diagram of an electromagnetic signal environment in accordance with an illustrative example.

Pointing electromagnetic signal receiver at an electromagnetic signal source also takes more time than desired and is more challenging than desired. With reference now to FIG. 3, an illustration of a block diagram of an electromagnetic signal environment is depicted in accordance with an illustrative example. In this illustrative example, electromagnetic signal environment 300 includes components that can be implemented in hardware such as the hardware shown in satellite 120 and receiver 122 and telescope 123 in FIG. 1.

In the illustrative example, electromagnetic signal receiver system 301 in electromagnetic signal environment 300 can be pointed to receive electromagnetic signals 303 from electromagnetic signal source 304. In this example, electromagnetic signal receiver system 301 comprises electromagnetic signal receiver 302 and controller 314. In this example, controller 314 is located in computer system 312. As depicted, computer system 312 is part of electromagnetic signal receiver system 301 in this example.

In this illustrative example, electromagnetic signal source 304 generates electromagnetic signals 303. Electromagnetic signals 303 can take a number of different forms. For example, electromagnetic signals 303 can be in a beam, collimated beam, omnidirectional signals, directional signals, or other types of radiation patterns for forms. Electromagnetic signals 303 can be selected from at least one of a laser beam, a radio frequency beam, a microwave beam, microwave signals, infrared signals, visible light signals, ultraviolet light signals, or other types of electromagnetic signals.

Electromagnetic signal source 304 can take a number of different forms. For example, electromagnetic signal source 304 can be a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Electromagnetic signal receiver 302 is a physical hardware system that can receive electromagnetic signals 303. Electromagnetic signal receiver 302 has field of view 321. In this illustrative example, hardware such as an antenna, radio receiver, photo detector, or other device that can detect electromagnetic signals 303 that are in field of view 321. This hardware is unable to detect or use electromagnetic signals 303 outside the field of view 321. The hardware can include receiver 383. Receiver 383 can be implemented using a receiver such as a photodetector, a photodiode system, a phase array antenna, focal plane array (FPA), cell (QC), or other suitable types of hardware.

In another illustrative example, electromagnetic signal receiver 302 can include telescope 382. Telescope 382 is a hardware component collecting incoming electromagnetic signals onto a detector in receiver 383.

In this illustrative example, field of view (FOV) 321 is the view that electromagnetic signal receiver 302 has to see or receive electromagnetic signals 303. Field of view 321 may be described as the angular range within which electromagnetic signal receiver 302 can detect or receive electromagnetic signals 303. In this example, field of view 321 can be defined by telescope 382.

In this example, field of view 321 can also be described as the instantaneous angle subtended by the scanning system that exceeds the detection threshold (e.g., the divergence angle of the laser beam (above threshold) for a laser-scanning system, or the sensor field of view for a receiving sensor).

In some illustrative examples, the size of field of view 321 can be controlled. Field of view 321 should have a size that enables detecting electromagnetic signals 303. For example, the time for nearest to maximum scan 340 to locate electromagnetic signal source 304 is faster than current techniques such as those that use a continuous file scan a segment scan oil raster scan. However, actually detecting electromagnetic signals 303 may be difficult with electromagnetic signals 303 being too weak for detection with the size of field of view 321. For example, the aperture or coping defining the field of view for a receiver may pick up signals from other sources for noises in addition to the signals from the desired source. As result, the receiver may struggle to identify and isolate electromagnetic signals 303 from the surrounding noise. As result, reducing or narrowing field of view 321 be performed to reduce issues with noise. In other words, size of field of view 321 can be adjusted to increase the signal-to-noise ratio.

In another example, the scan time becomes slower as field of view 321 is decreased. At some point, field of view 321 may be able to easily detect electromagnetic signals 303.

However, the amount of scan time may be much slower than desired and may be slower than current techniques.

The size of field of view 321 can be selected such that electromagnetic signals 303 can be just barely detectable. In other words, these electromagnetic signals can be detected over noise that may be present. With this size for field of view 321, nearest to maximum scan 340 can be performed within a desired amount of time such as less than techniques that use a continuous scan based on a nearest neighbor.

Controller 314 can be implemented in the same manner as controller 214 in FIG. 2 in which program instructions 318 can be used to implement controller 214 that are executed by a number of processor units 316 in computer system 312. Program instructions 318, the number of processor units 316, and computer system 312 can be implemented in a manner similar to program instructions 218, processor units 216, and the computer system 212 in FIG. 2.

Controller 314 is configured to control the operation of electromagnetic signal receiver 302. In this illustrative example, controller 314 controls electromagnetic signal receiver 302 to move field of view 321 of electromagnetic signal receiver 302 to location 322 nearest to maximum 323 of uncertainty area 381 in which an electromagnetic signal source 304 is expected to be located. This moving of field of view 321 can also be referred to as pointing field of view 321.

Further, in this example, controller 314 moves field of view 321 of electromagnetic signal receiver 302 from location 322 to next location 324 nearest to maximum 323 of uncertainty area 381 in response to not detecting electromagnetic signals 303 from electromagnetic signal source 304 at location 322. In this example, next location 324 becomes current location 325 for field of view 321.

Controller 314 continues to move field of view 321 from current location 325 to next location 324 nearest to maximum 323 of uncertainty area 381 from current location 325 in response to not detecting electromagnetic signals 303 from electromagnetic signal source 304. This type of movement of the field of view 321 is a nearest to maximum scan 340. This scan can be nearest to maximum hexagonal scan 341 with uncertainty area 381. In this example, uncertainty area 381 can be in a shape of hexagon 391. In other examples, uncertainty area 381 can be a shape selected from a group comprising a circle, an octagon, an ellipse, or some other suitable shape in addition to or in place of hexagon 391.

Also in this illustrative example, controller 314 can continue to move field of view 321 from current location 325 to next location 324 nearest to maximum 323 of uncertainty area 381 from current location 325 with dwell time 350 at each location in response to not detecting the electromagnetic signals 303 from electromagnetic signal source 304. In other words, including field of view 321 from one location to another location, field of view 321 may remain or stay at one location for a period of time or move to another location.

In yet another example, controller 314 continues to move field of view 321 from current location 325 to next location 324 nearest to maximum 323 of uncertainty area 381 from current location 325 with continuous movement 351 from one location to another location in response to not detecting electromagnetic signals 303 from electromagnetic signal source 304. In this example, field of view 321 moves to different locations without stopping or pausing at the different locations.

Further, controller 314 can change the manner in which field of view 321 is moved. In this example, controller 314 can begin with nearest to maximum scan 340 and change to nearest neighbor scan 342. This type of scan in which the scanning changes from nearest to maximum scan 340 to nearest neighbor scan 342 is referred to as hybrid scan 363.

For example, controller 314 moves field of view 321 to neighbor location 343 of nearest neighbor 344 in response to time 348 for moving field of view 321 from current location 325 to next location 324 using location 322 nearest to maximum 323 of uncertainty area 381 being greater than threshold 347. In this example, next location 324 becomes current location 325.

Controller 314 continues to move field of view 321 from current location 325 to subsequent neighbor location reported by nearest neighbor 344 from current location 325 in response to time 348 for moving field of view 321 from current location 325 to next location 324 using location 322 nearest to maximum 323 of uncertainty area 381 being greater than threshold 347 and in response to not detecting electromagnetic signals 303 from electromagnetic signal source 304.

In this case, threshold 347 can be selected as the time for moving field of view 321 from one location to a neighboring location. In another illustrative example, the threshold can be a lower time or some other suitable time.

Also, moving field of view 321 to neighbor location 343 of nearest neighbor 344 and continuing to move field of view 321 from current location 325 to subsequent neighbor location 345 of nearest neighbor 344 from current location 325 can be part of nearest neighbor scan 342. This nearest neighbor scan can be selected from one of a continuous spiral scan, a step spiral scan, a segmented scan, and a raster scan.

In this illustrative example, controller 314 can detect electromagnetic signals 303 from electromagnetic signal source 304 in response to detecting selected electromagnetic signals that are greater than a noise level in field of view 321. In response to detecting electromagnetic signals 303, controller 314 can establish communications with electromagnetic signal source 304. The communications are selected from one of unidirectional communications and bidirectional communications. In the illustrative example, the communications that are unidirectional from electromagnetic signal source 304 to electromagnetic signal receiver 302 does not necessarily require electromagnetic signal source 304 to know that electromagnetic signals 303 are being received by electromagnetic signal receiver 302.

The illustration of electromagnetic signal environment 300 in FIG. 3 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic signal receiver system 301 can be located on a platform. The platform can be a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, controller 314 can be located in a separate platform or location from electromagnetic signal receiver system 301. Additionally, electromagnetic signal receiver system 301 may be used with an electromagnetic signal transmission system such as electromagnetic beam transmission system 202. In this example, a single controller can be present that controls both systems and that controller can be in a separate location from the systems.

In yet another illustrative example, controller 314 can be controlled by one or more electromagnetic signal receiver systems in addition to or in place of electromagnetic signal receiver system 301.

In one illustrative example, controller 314 in electromagnetic signal receiver system 301 is configured to control electromagnetic signal receiver 302 to move field of view 321 of electromagnetic signal receiver 302 to location 322 in uncertainty area 381 using a scan metric. Uncertainty area 381 is an area in which an electromagnetic signal source 304 is expected to be located. Controller 314 is configured to control electromagnetic signal receiver 302 to move field of view 321 from location 322 to next location 324 using the scan metric in response to not detecting electromagnetic signals 303 from electromagnetic signal source 304 at location 322. Next location 324 becomes current location 325 for field of view 321. Controller 314 is configured to control electromagnetic signal receiver 302 to continue to move field of view 321 from current location 325 to next location 324 using the scan metric in response to not detecting electromagnetic signals 303 from electromagnetic signal source 304.

Further, controller 314 can select next location 324 in uncertainty area 381 from a set of candidate locations that has a highest value for the scan metric. The scan metric is as follows:

$$M = PDF_{int}/t_{tot}$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from a current location to the next potential location, and $t_{dwell}$ is a time the line of site dwells at the next potential location.

Figure 4:
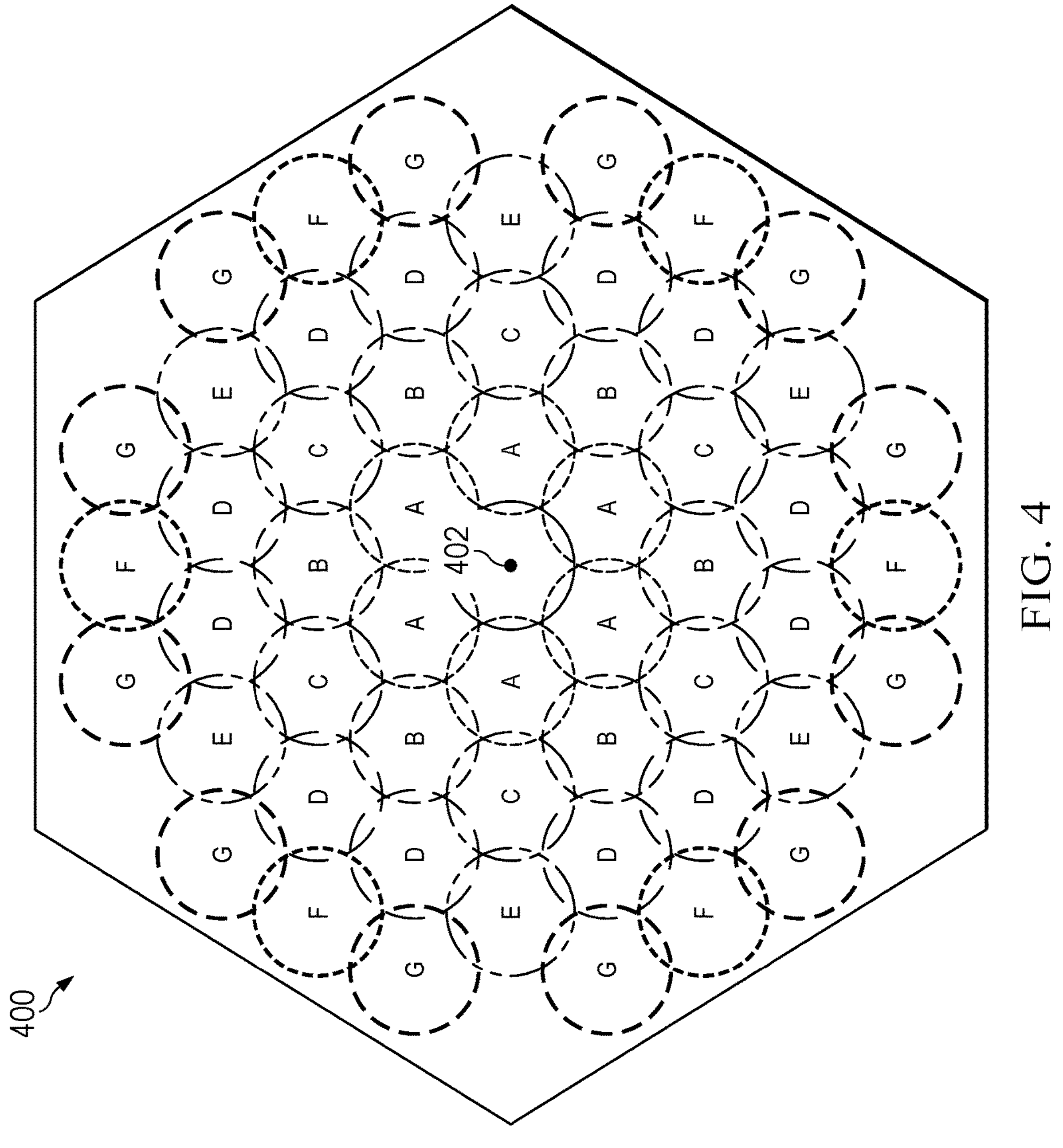
FIG. 4 is an illustration of locations for pointing an electromagnetic beam system or an electromagnetic signal receiver in accordance with an illustrative example.

With reference now to FIG. 4, an illustration of locations for pointing an electromagnetic beam system or an electromagnetic signal receiver is depicted in accordance with an illustrative example. In this example, locations are depicted within area 400. This area is an example of an implementation for uncertainty area 281 in FIG. 2 and uncertainty area 381 in FIG. 3. As depicted, area 400 has a hexagonal shape.

In this example, an electromagnetic beam receiver for an electromagnetic signal source is expected to be within area 400. In this example, locations can be selected to be the nearest to maximum of uncertainty area 400. In this example, the maximum of uncertainty area 400 is center 402. In other illustrative examples, the maximum uncertainty area 400 can be in other locations other than center 402.

For example, the first location can be locations for center 402. The next locations closest to center 402 are locations A.

Locations selected that are closest to center 402 after locations A are locations B. The next locations used for pointing electromagnetic beams or field of views are locations C. The next locations closest to center 402 are locations D with locations E being the next locations closest to the center after locations D. The next locations closest to center 402 are locations F followed by locations G.

As can be seen, this type of selection of locations is not a nearest neighbor selection as currently used. In some cases, moving from one location to another location may take more time than using a nearest neighbor selection location. In this case, the process can change from using the nearest to maximum scan of locations to a nearest neighbor scan for locations. A threshold time for changing the type of scan can be selected based on a number of different considerations. This type of scan is a hybrid scan in these different illustrative examples.

Figure 5:
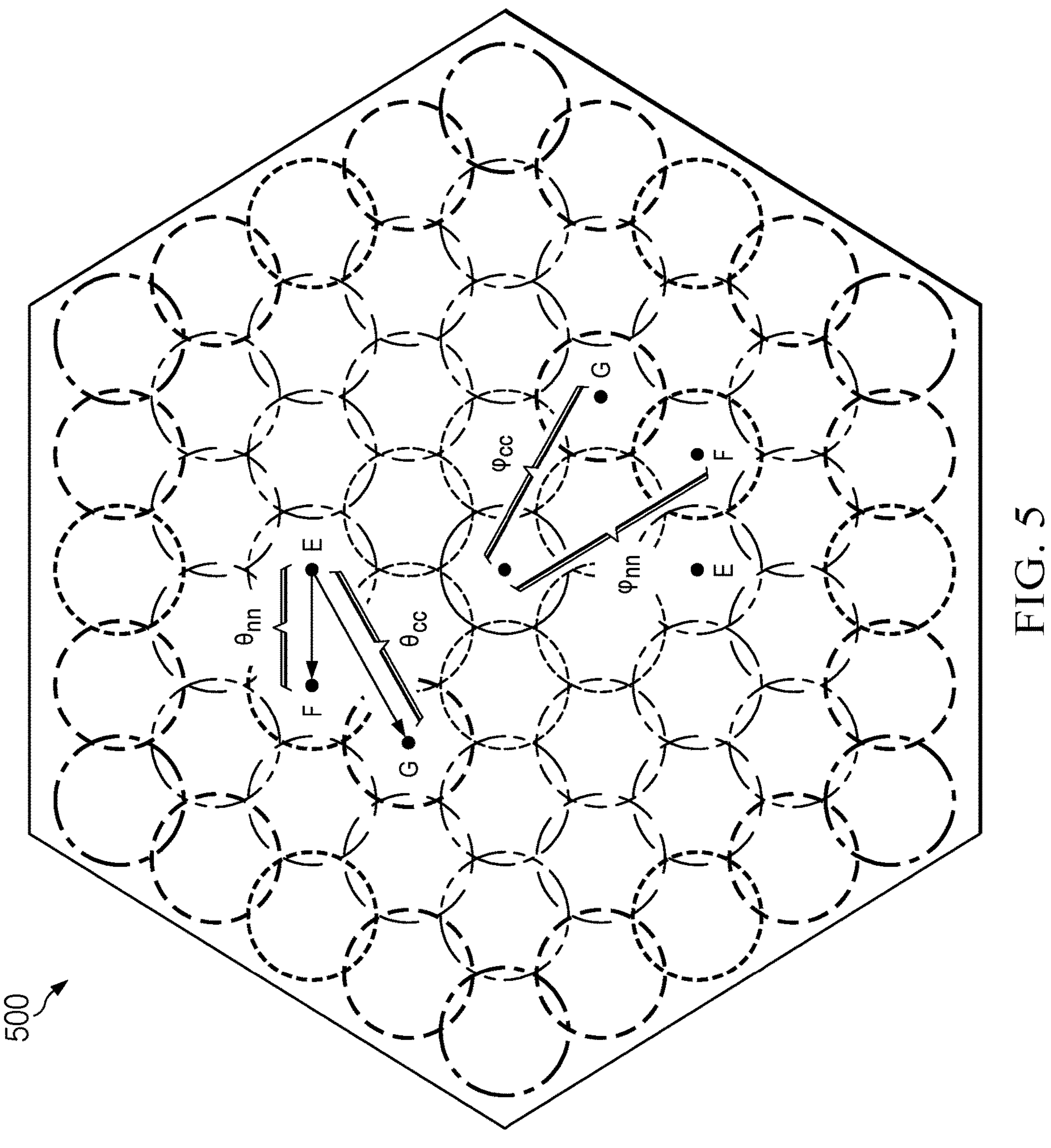
FIG. 5 is an illustration of locations and beam spots and angles between beam spots in accordance with an illustrative example.

Turning to FIG. 5, an illustration of locations and for beam spots and angles between beam spots is depicted in accordance with an illustrative example. In this example, a scan for directing an electromagnetic beam at beam spots 500 in a pattern can be performed using a nearest to maximum scan. The pattern includes the location of beam spots as well as an order in which an electromagnetic beam is directed to the different beam spots. This pattern can also be referred to as a beam spot pattern. This type of scan can be used to find a location of an electromagnetic beam receiver more quickly as compared to current scanning techniques.

As depicted, angle θcc is between beam spot E and beam spot G, and angle $\theta_{nn}$ is between beam spot E and beam spot F. Also shown is angle $\varphi_{cc}$ between the center and beam spot G, and angle $\varphi_{nn}$ is between the center and beam spot F. These angles can be used in determining a pattern of beam spots for pointing an electromagnetic beam.

In this example, the beam spot pattern can be determined using a nearest to maximum scan. For a given beam spot pattern, the following equation can be used:

$$t_{net\ savings} \approx \frac{t_{scan}}{N}[PDF(\varphi_{cc}) - PDF(\varphi_{nn})] - \frac{\theta_{cc} - \theta_{nn}}{\text{slew rate}} \quad \text{Equation A}$$

where $t_{net\ savings}$ is the time saved for a single jump from beam spot to beam spot using the nearest to maximum scan relative to the nearest neighbor scan. In other words, this variable is the time it takes for a single jump from one beam spot to another beam spot using the nearest to maximum scan approach minus the time it takes for a single jump from beam spot to beam spot using the nearest neighbor scan to determine the beam spot pattern.

$t_{scan}$ is the total scan time to use the nearest neighbor scan.

N is the total number of beam spots in the scan pattern.

$PDF(\varphi_{cc})$ is a unitless value of the probability density function for the beam spot that was moved to for the nearest to maximum scan. This value is a function of distance from the beam spot to the center of the probability density function, which is equivalent to an angle defined as "φ".

$PDF(\varphi_{nn})$ is the unitless value of the probability density function for the beam spot that was moved to for the nearest neighbor scan.

$\theta_{cc}$ is the angular separation between two beam spots when jumping from beam spot to beam spot using the nearest to maximum scan. The units can be degrees or radians.

$\theta_{nn}$ is the angular separation between two beam spots when jumping from beam spot to beam spot using the nearest neighbor scan.

slew rate is the speed at which the gimble moves. The units are angular change over time (e.g., degree/s or rad/s).

Example 1

In this example, the slew rate is infinite. This infinite slew rate means the electromagnetic beam instantly jumps from beam spot to beam spot. In this case Equation A becomes:

$$t_{net\ savings} \approx \frac{t_{scan}}{N}[PDF(\varphi_{cc}) - PDF(\varphi_{nn})] - \frac{\theta_{cc} - \theta_{nn}}{\infty} = \frac{t_{scan}}{N}[PDF(\varphi_{cc}) - PDF(\varphi_{nn})]$$

Since PDF($\varphi_{cc}$)cc)≥PDF($\varphi_{nn}$), $t_{net\ savings}$ ≥0, there is never a need to switch from the closest to center scan to the nearest neighbor scan for determining the beam spot pattern.

Example 2

In this example, the slew rate can be considered zero resulting in the following:

$$t_{net\ savings} \approx \frac{t_{scan}}{N}[PDF(\varphi_{cc}) - PDF(\varphi_{nn})] - \frac{\theta_{cc} - \theta_{nn}}{0} = -\infty$$

In this case, the nearest to maximum scan is not needed because the $t_{net\ savings}$<0.

Example 3

Example 1 showed that if the slew rate is sufficiently fast, it always saves time to use the nearest to maximum scan to determine a beam spot pattern. Example 2 shows that if the slew rate is sufficiently slow, no time savings is present. In this example, the nearest neighbor scan is used.

If the slew rate is something in between these extremes, initially, time savings are present using the nearest to maximum scan. When the time savings change from a positive savings to a negative savings, a switch to the nearest neighbor scan can be used.

Figure 6:
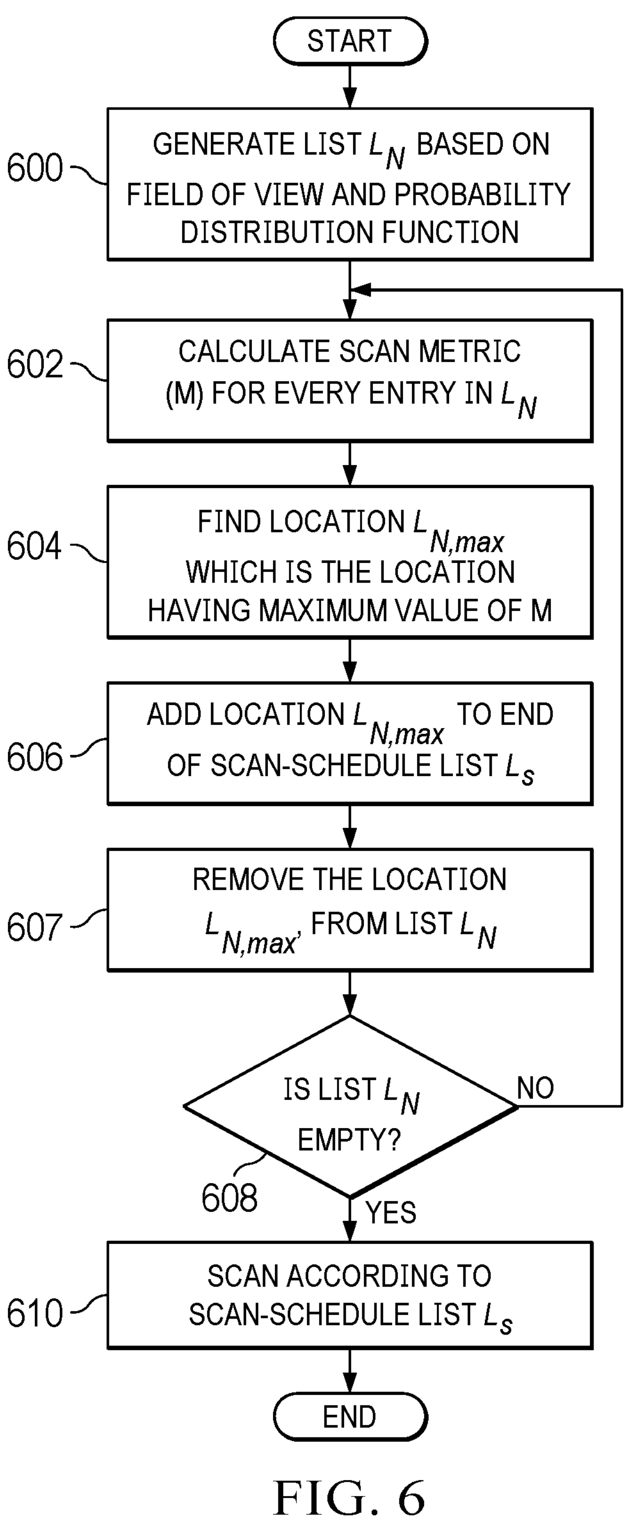
FIG. 6 is an illustration of a flowchart of a process for identifying locations for scanning an uncertainty area in accordance with an illustrative example.

Turning next to FIG. 6, an illustration of a flowchart of a process for identifying locations for scanning an uncertainty area is depicted in accordance with an illustrative example. The process in FIG. 6 can be implemented in hardware, software, or both. When implemented in software, the process can take the form of program instructions that are run by one of more processor units located in one or more hardware devices in one or more computer systems. This process can be implemented to identify locations for pointing an electromagnetic beam emitted from magnetic beam transmission system from and for pointing a field of view or an electromagnetic signal receiver. For example, the process can be implemented in controller 214 in computer system 212 in electromagnetic beam transmission system 202 in FIG. 2 and in controller 314 in computer system 312 in electromagnetic signal receiver system 301 in FIG. 3.

In this example, the pointing involves moving or directing electromagnetic beam 203 in FIG. 2 or field of view 321 in FIG. 3.

In this example, the field of view can be pointed at an uncertainty area. This uncertainty area is an example of uncertainty area 381 in FIG. 3. This uncertainty area can also be referred to as a field of regard (FOR).

The process begins by generating a list $L_N$ of all possible locations for the next scan step (operation 600). In operation 600, the possible locations are potential next locations for scanning. The process calculates a scan metric (M) for every entry in the list ($L_N$) (operation 602).

In operation 602, the scan metric is as follows:

$$M = PDF_{int}/t_{tot}$$

where $PDF_{int}$ is the probability density function (PDF) integrated over an area of interest (AOI) for the next potential dwell location. The area of interest for pointing an electromagnetic beam is the region over which the electromagnetic beam exceeds the detection threshold. The area of interest for an electromagnetic signal receiver is the region of the field of view (FOV) for the electromagnetic signal receiver.

In this example, the total time, $t_{tot}$, is given by $t_{tot}=t_{slew}+t_{dwell}$, where $t_{slew}$ is the time it takes to slew the line-of-sight (LOS) from the current dwell location to the next potential location, and $t_{dwell}$ is the time the line of sight dwells at the next potential location. After the dwell at the current location, that dwell location is removed from the list of next possible dwell locations, and the process is repeated until there are no remaining possible dwell locations. The line of sight can be the center of the field of view and is moved to point the electromagnetic signal receiver to different locations.

The process finds location $L_{N,max}$, which is the location having maximum value of M (operation 604). In operation 604, the location $L_{N,max}$ is the location in the list $L_N$ with the maximum value for M. The system adds the location $L_{N,max}$ to the end of scan-schedule list $L_S$ (operation 606). In operation 606, the scan-schedule list $L_S$ is a scan-schedule list that saves an optimal order of scan steps to use in moving the field of view to different locations.

The process then removes the location $L_{N,max}$ from list $L_N$ (operation 607). The process determines whether the list $L_N$ is empty (operation 608). In operation 608, If list $L_N$ is not empty, the process returns to operation 602. Otherwise, the process proceeds to scan according to the scan-schedule list $L_S$ (operation 610) with the process terminating thereafter.

Figure 7:
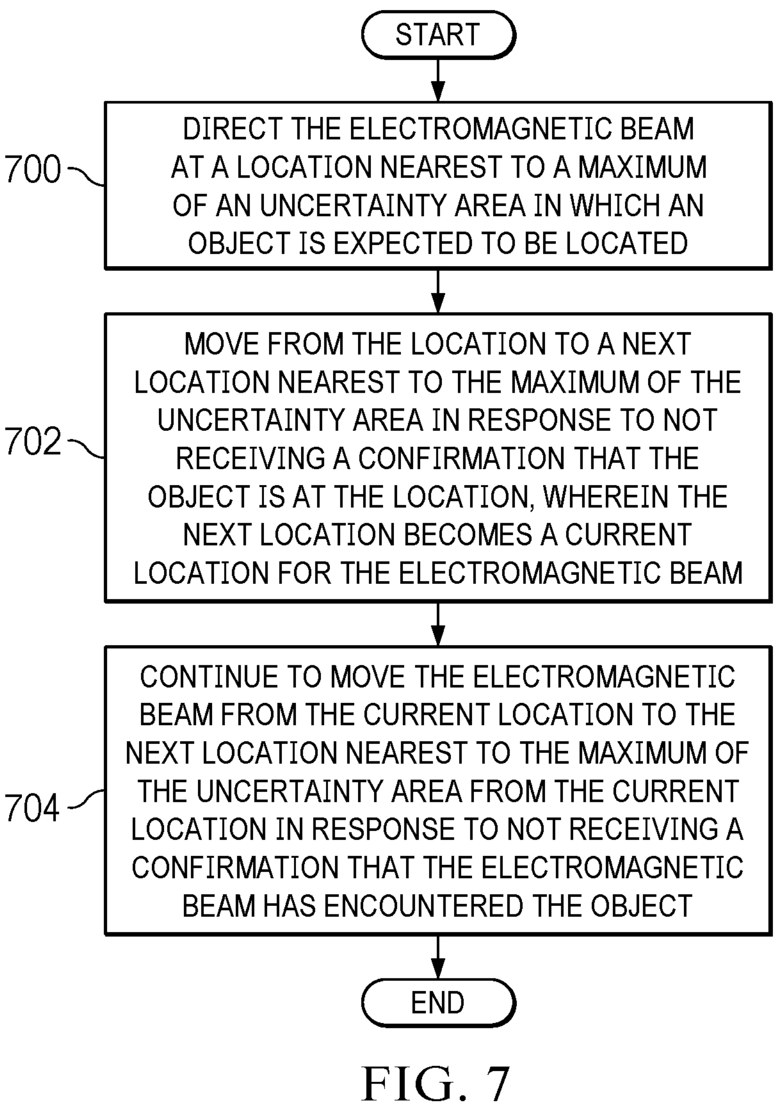
FIG. 7 is an illustration of a flowchart of a method for pointing an electromagnetic beam in accordance with an illustrative example.

With reference next to FIG. 7, an illustration of a flowchart of a method for pointing an electromagnetic beam is depicted in accordance with an illustrative example. The process in FIG. 7 can be implemented in hardware, software, or both. When implemented in software, the process can take the form of program instructions that are run by one of more processor units located in one or more hardware devices in one or more computer systems. For example, the process can be implemented in controller 214 in computer system 212 in electromagnetic beam system 220 in FIG. 2.

The process begins by directing the electromagnetic beam at a location nearest to a maximum of an uncertainty area in which an object is expected to be located (operation 700). The process moves from the location to a next location nearest to the maximum of the uncertainty area in response to not receiving a confirmation that the object is at the location, wherein the next location becomes a current location for the electromagnetic beam (operation 702).

The process continues to move the electromagnetic beam from the current location to the next location nearest to the maximum of the uncertainty area from the current location in response to not receiving a confirmation that the electromagnetic beam has encountered the object (operation 704). The process terminates thereafter.

In one illustrative example, the object can be an uncooperative object. In these examples, an uncooperative object is one that is not providing feedback that can be used as a confirmation that the object is in the location. In other words, if the electromagnetic beam is a laser beam and the object is a satellite, a satellite does not provide any feedback that the laser beam has encountered or eliminated a satellite. An uncooperative object can be, for example, that the satellite is not functioning. However, a confirmation that the laser beam has encountered the satellite can be detected by the reflection of the laser beam from the satellite.

Figure 8:
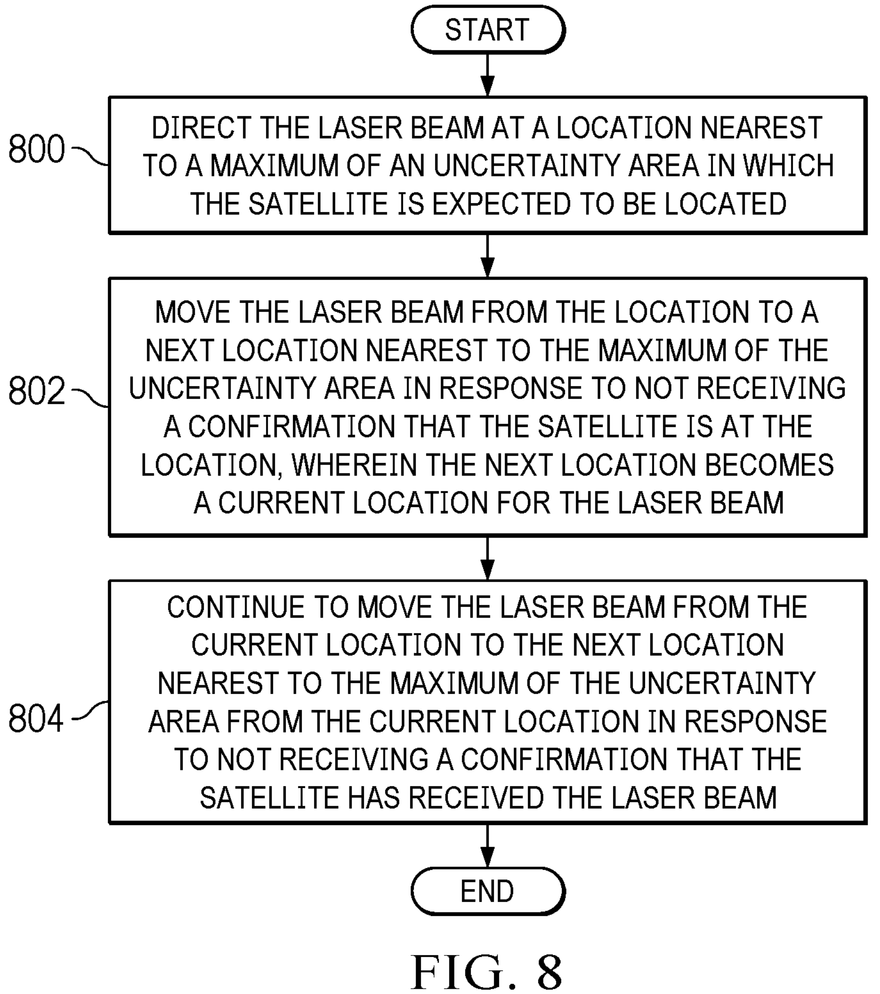
FIG. 8 is an illustration of a flowchart of a method for pointing a laser beam in accordance with an illustrative example.

With reference next to FIG. 8, an illustration of a flowchart of a method for pointing a laser beam is depicted in accordance with an illustrative example. The process in FIG. 8 can be implemented in hardware, software, or both. When implemented in software, the process can take the form of program instructions that are run by one of more processor units located in one or more hardware devices in one or more computer systems. For example, the process can be implemented in controller 214 in computer system 212 in laser beam system 230 in FIG. 2.

The process directs the laser beam at a location nearest to a maximum of an uncertainty area in which the satellite is expected to be located (operation 800). The process moves the laser beam from the location to a next location nearest to the maximum of the uncertainty area in response to not receiving a confirmation that the satellite is at the location, wherein the next location becomes a current location for the laser beam (operation 802). In operation 802, the movement can be movement in the form of a nearest to maximum hexagonal scan with the uncertainty area taking the form of a hexagon.

The process continues to move the laser beam from the current location to the next location nearest to the maximum of the uncertainty area from the current location in response to not receiving a confirmation that the satellite has received the laser beam (operation 804). The process terminates thereafter.

Figure 9:
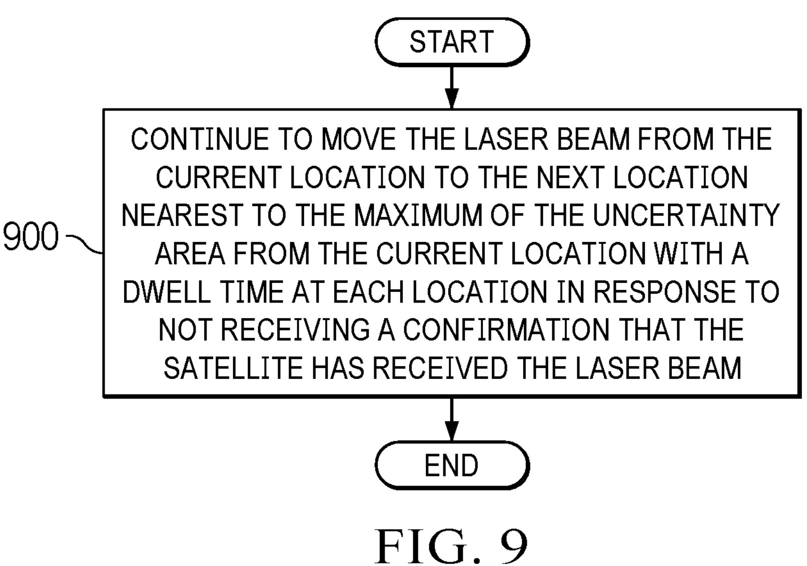
FIG. 9 is an illustration of a flowchart of a process for continuing to move a laser beam in accordance with an illustrative example.

Turning next to FIG. 9, an illustration of a flowchart of a process for continuing to move a laser beam is depicted in accordance with an illustrative example. The process in this flowchart is an example of an implementation for operation 804 in FIG. 8.

The process continues to move the laser beam from the current location to the next location nearest to the maximum of the uncertainty area from the current location with a dwell time at each location in response to not receiving a confirmation that the satellite has received the laser beam (operation 900). The process terminates thereafter.

Figure 10:
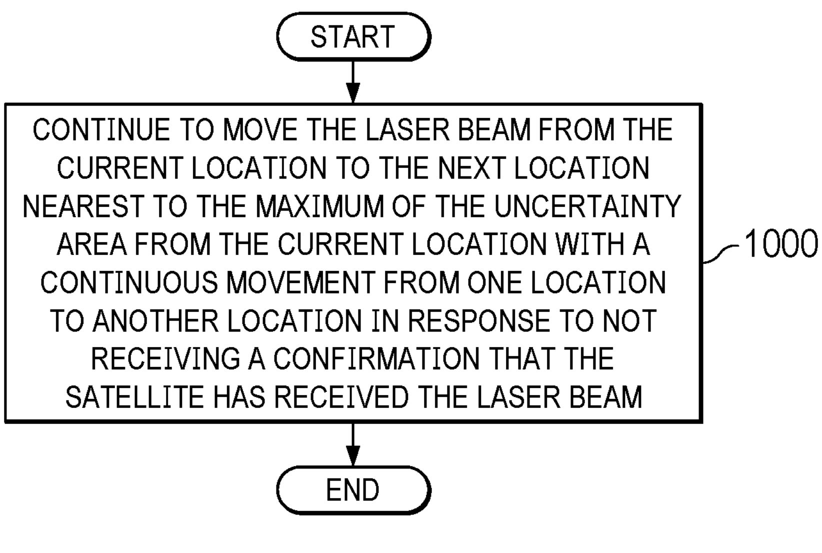
FIG. 10 is an illustration of a flowchart of a process for continuing a laser beam in accordance with an illustrative example.

In FIG. 10, an illustration of a flowchart of a process for continuing a laser beam is depicted in accordance with an illustrative example. The process in this flowchart is an example of an implementation for operation 804 in FIG. 8.

The process continues to move the laser beam from the current location to the next location nearest to the maximum of the uncertainty area from the current location with a continuous movement from one location to another location in response to not receiving a confirmation that the satellite has received the laser beam (operation 1000). The process terminates thereafter.

Figure 11:
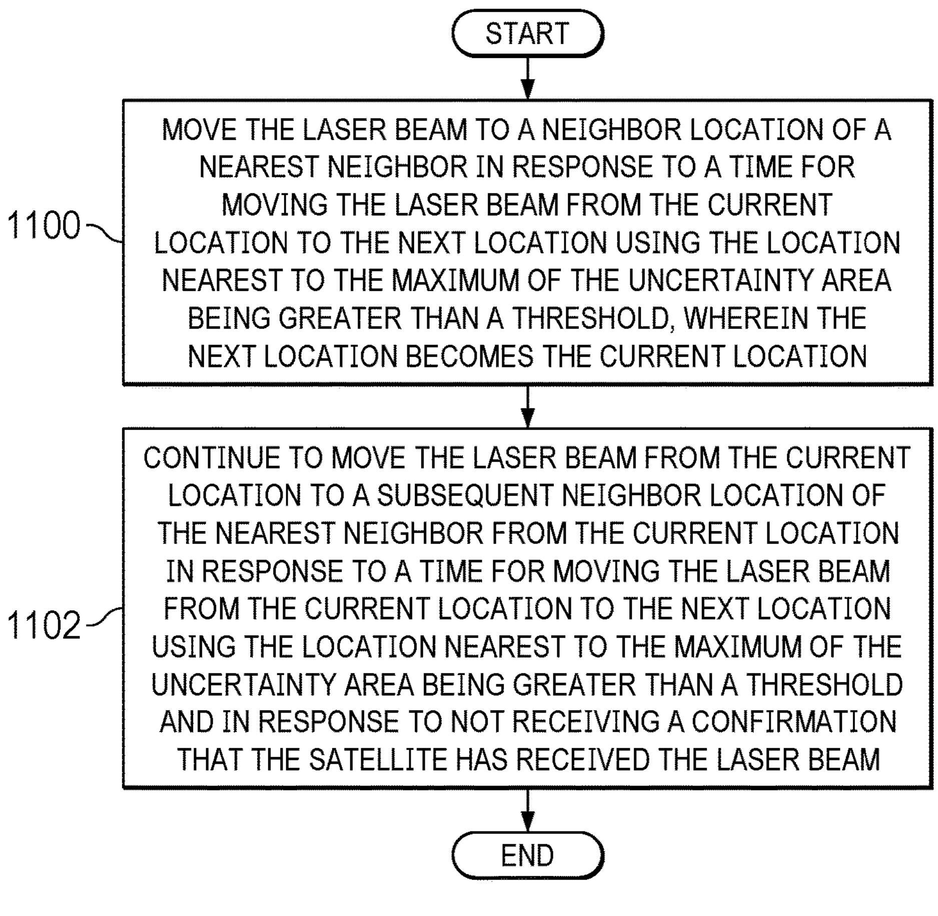
FIG. 11 is an illustration of a flowchart of a process for moving a laser beam in accordance with an illustrative example.

Turning now to FIG. 11, an illustration of a flowchart of a process for moving a laser beam is depicted in accordance with an illustrative example. The process in this flowchart is an example of additional operations that can be performed with the operations in FIG. 8.

The process moves the laser beam to a neighbor location of a nearest neighbor in response to a time for moving the laser beam from the current location to the next location using the location nearest to the maximum of the uncertainty area being greater than a threshold, wherein the next location becomes the current location (operation 1100). The process continues to move the laser beam from the current location to a subsequent neighbor location of the nearest neighbor from the current location in response to a time for moving the laser beam from the current location to the next location using the location nearest to the maximum of the uncertainty area being greater than a threshold and in response to not receiving a confirmation that the satellite has received the laser beam (operation 1102). The process terminates thereafter.

In this illustrative example, moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Figure 12:
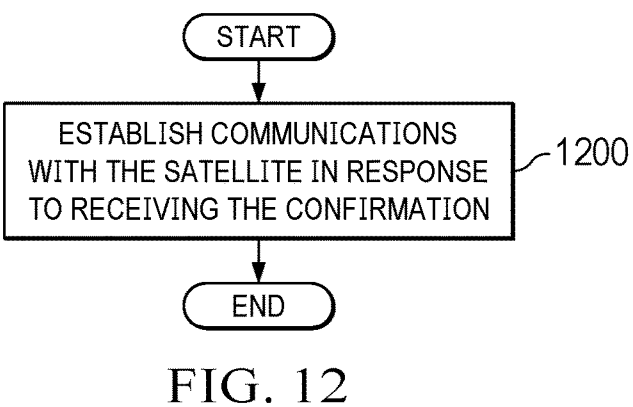
FIG. 12 is an illustration of a flowchart of a process for establishing communications in accordance with an illustrative example.

With reference next to FIG. 12, an illustration of a flowchart of a process for establishing communications is depicted in accordance with an illustrative example. The process in this figure is an example of an additional operation that can be performed with the operations in FIG. 8.

The process establishes communications with the satellite in response to receiving the confirmation (operation 1200). The process terminates thereafter. In operation 1200, communications are selected from one of unidirectional communications and bidirectional communications.

Figure 13:
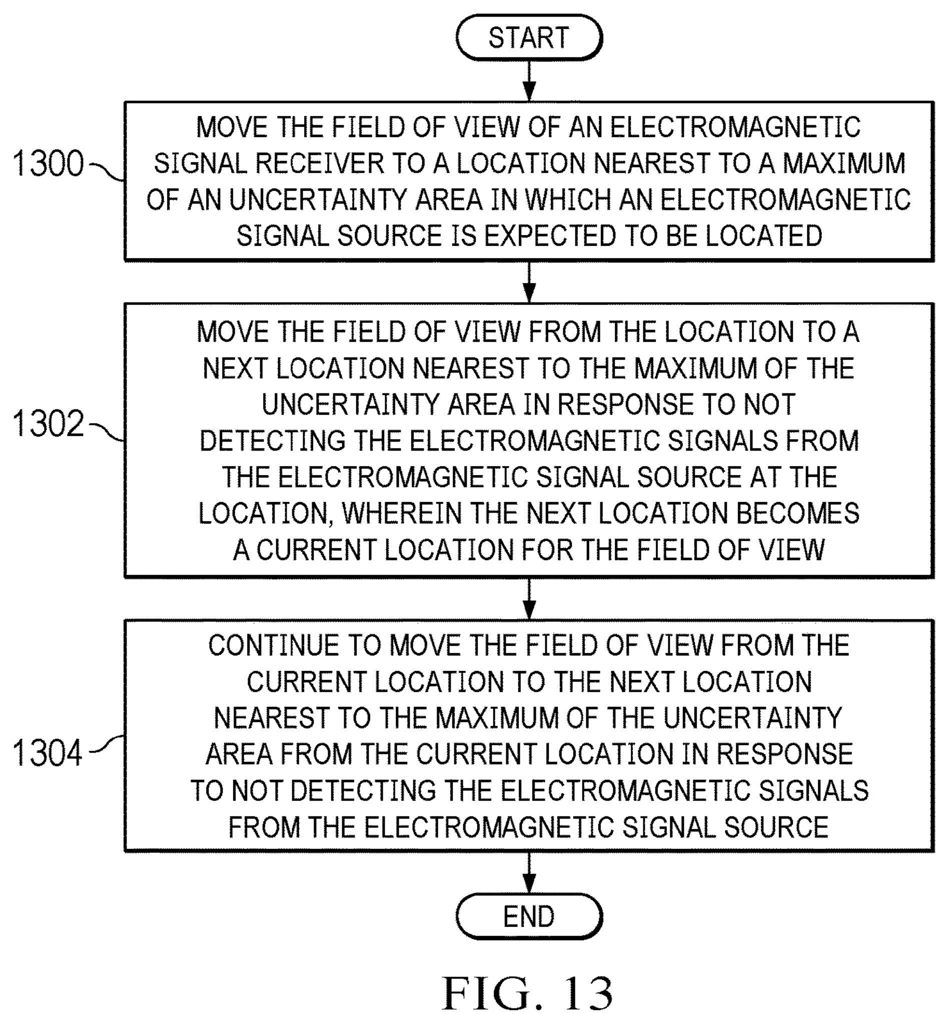
FIG. 13 is an illustration of a flowchart of a process for receiving electromagnetic signals in accordance with an illustrative example.

Turning to FIG. 13, an illustration of a flowchart of a process for receiving electromagnetic signals is depicted in accordance with an illustrative example. The process in FIG. 13 can be implemented in hardware, software, or both. When implemented in software, the process can take the form of program instructions that are run by one of more processor units located in one or more hardware devices in one or more computer systems. For example, the process can be implemented in controller 314 in computer system 312 in electromagnetic signal receiver system 301 in FIG. 3.

The process moves the field of view of an electromagnetic signal receiver to a location nearest to a maximum of an uncertainty area in which an electromagnetic signal source is expected to be located (operation 1300). Next, the process moves the field of view from the location to a next location nearest to the maximum of the uncertainty area in response to not detecting the electromagnetic signals from the electromagnetic signal source at the location, wherein the next location becomes a current location for the field of view (operation 1302).

The process continues to move the field of view from the current location to the next location nearest to the maximum of the uncertainty area from the current location in response to not detecting the electromagnetic signals from the electromagnetic signal source (operation 1304). The process terminates thereafter. In this example, the movement of the laser beam is in a form of a nearest to maximum hexagonal scan.

Figure 14:
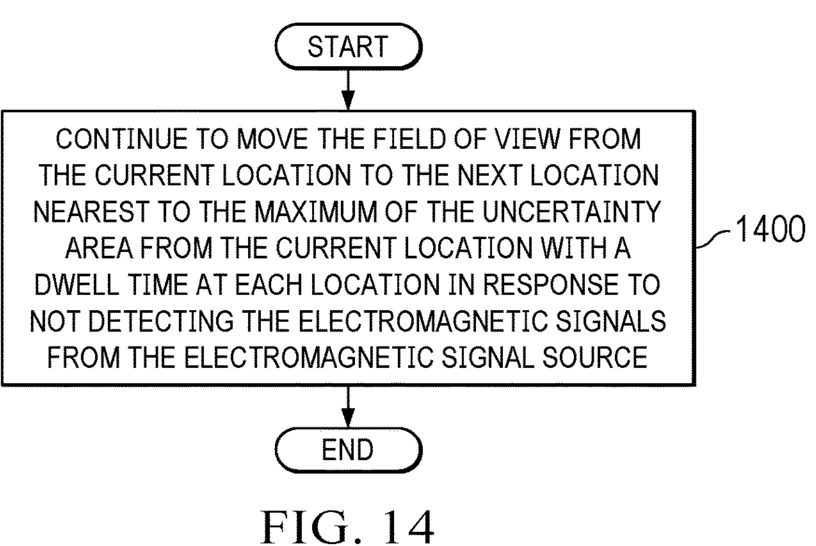
FIG. 14 is an illustration of a flowchart of a process for continuing to move a field of view in accordance with an illustrative example.

Turning next to FIG. 14, an illustration of a flowchart of a process for continuing to move a field of view is depicted in accordance with an illustrative example. The process in this figure is an example of an implementation for operation 1304 in FIG. 13.

The process continues to move the field of view from the current location to the next location nearest to the maximum of the uncertainty area from the current location with a dwell time at each location in response to not detecting the electromagnetic signals from the electromagnetic signal source (operation 1400). The process terminates thereafter.

Figure 15:
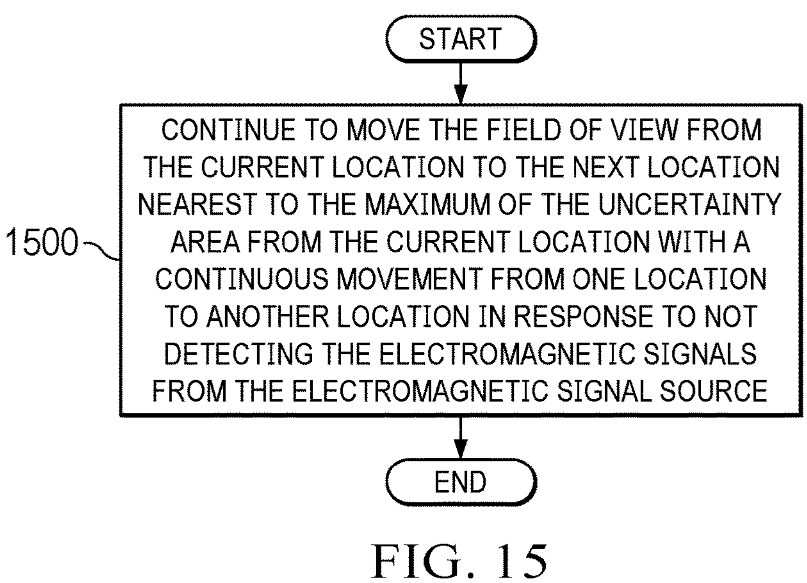
FIG. 15 is an illustration of a flowchart of a process for continuing to move a field of view in accordance with an illustrative example.

In FIG. 15, an illustration of a flowchart of a process for continuing to move a field of view is depicted in accordance with an illustrative example. The process in this figure is an example of an implementation for operation 1304 in FIG. 13.

The process continues to move the field of view from the current location to the next location nearest to the maximum of the uncertainty area from the current location with a continuous movement from one location to another location in response to not detecting the electromagnetic signals from the electromagnetic signal source (operation 1500). The process terminates thereafter.

Figure 16:
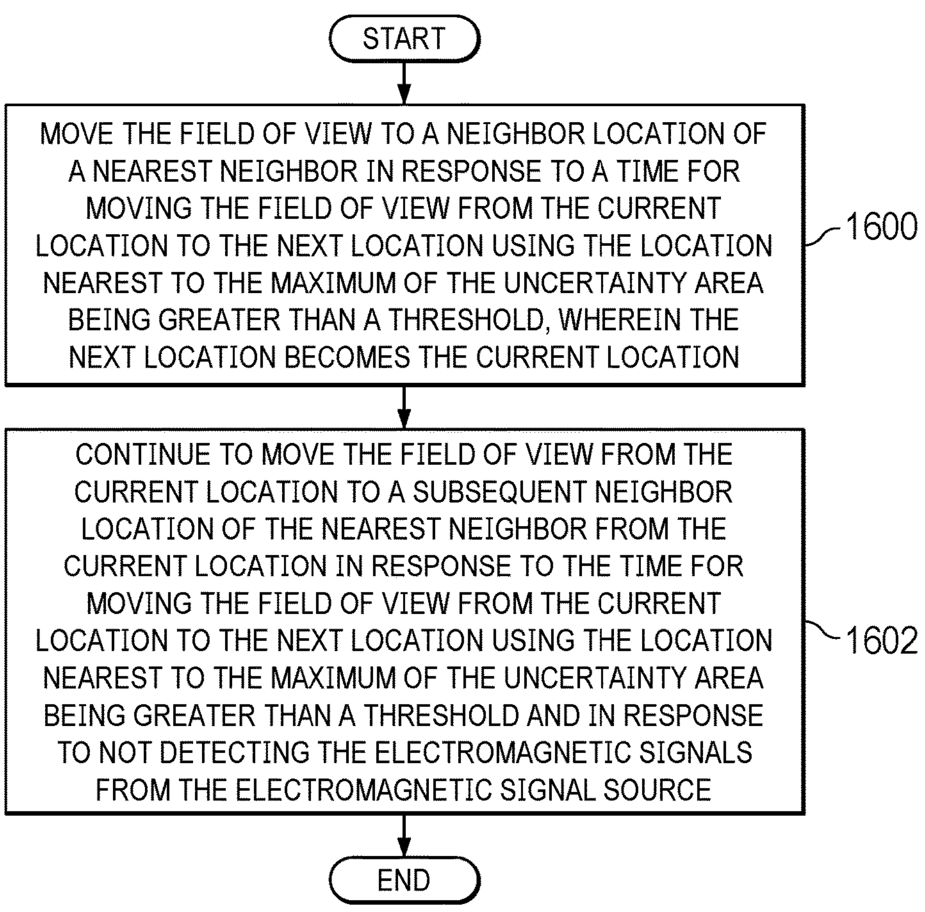
FIG. 16 is an illustration of a flowchart of an operation for moving a field of view in accordance with an illustrative example.

Next in FIG. 16, an illustration of a flowchart of an operation for moving a field of view is depicted in accordance with an illustrative example. The process in this figure is an example of additional operations that can be performed with the process in FIG. 13.

The process moves the field of view to a neighbor location of a nearest neighbor in response to a time for moving the field of view from the current location to the next location using the location nearest to the maximum of the uncertainty area being greater than a threshold, wherein the next location becomes the current location (operation 1600). The process continues to move the field of view from the current location to a subsequent neighbor location of the nearest neighbor from the current location in response to the time for moving the field of view from the current location to the next location using the location nearest to the maximum of the uncertainty area being greater than a threshold and in response to not detecting the electromagnetic signals from the electromagnetic signal source (operation 1602). The process terminates thereafter.

Moving the field of view to the neighbor location of the nearest neighbor and continuing to move the field of view from the current location to a subsequent neighbor location of the nearest neighbor from the current location is part of a nearest neighbor scan selected from one of a continuous spiral scan, a step spiral scan, a segmented scan, and a raster scan.

Figure 17:
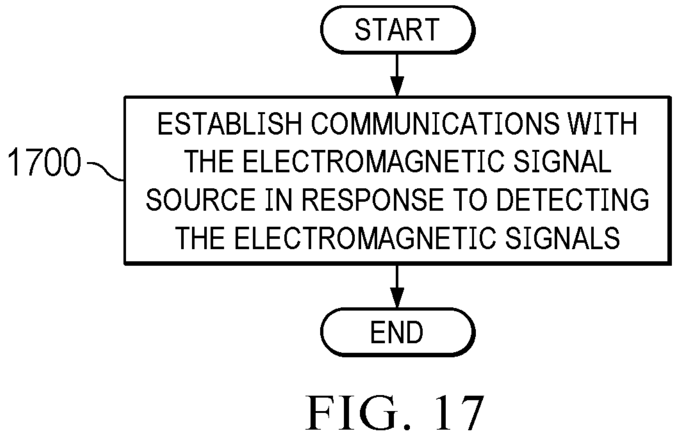
FIG. 17 is an illustration of a flowchart of a process for establishing communications in accordance with an illustrative example.

Turning now to FIG. 17, an illustration of a flowchart of a process for establishing communications is depicted in accordance with an illustrative example. The process in this flowchart is an example of additional operations that can be performed with the process in FIG. 13.

The process establishes communications with the electromagnetic signal source in response to detecting the electromagnetic signals (operation 1700). The process terminates thereafter.

Figure 18:
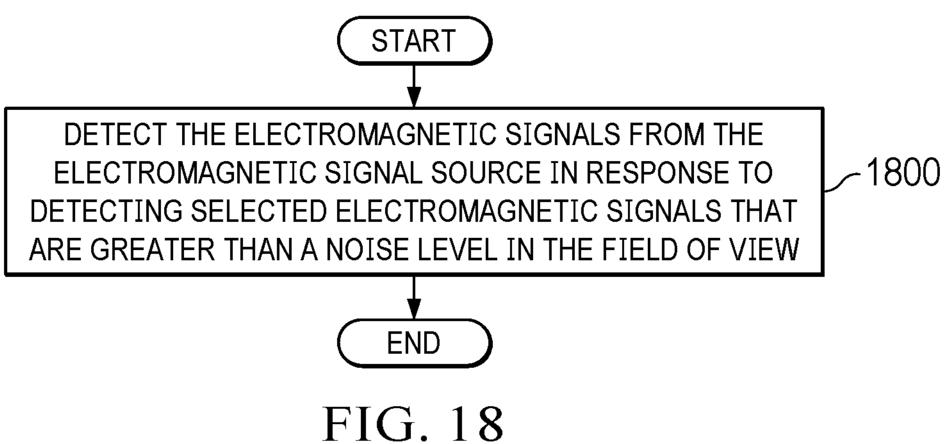
FIG. 18 is an illustration of a flowchart of a process for detecting electromagnetic signals in accordance with an illustrative example.

With reference next to FIG. 18, an illustration of a flowchart of a process for detecting electromagnetic signals is depicted in accordance with an illustrative example. The process in FIG. 18 is an example of additional operations that can be performed with the process in FIG. 13.

The process detects the electromagnetic signals from the electromagnetic signal source in response to detecting selected electromagnetic signals that are greater than a noise level in the field of view (operation 1800). The process terminates thereafter. In operation 1800, the communications are selected from one of unidirectional communications and bidirectional communications.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
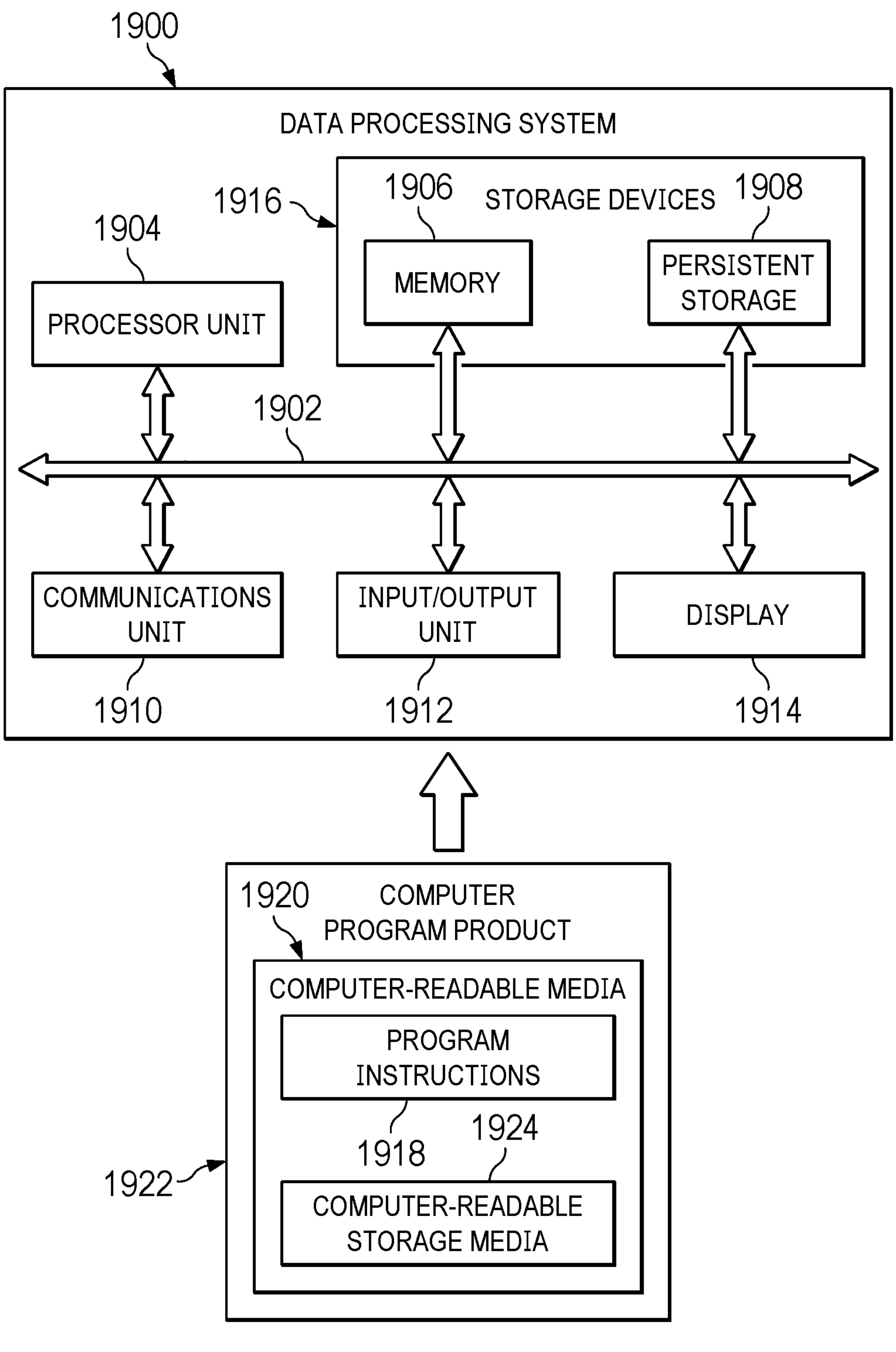
FIG. 19 is an illustration of a block diagram of a data processing system in accordance with an illustrative example.

Turning now to FIG. 19, a block diagram of a data processing system is depicted in accordance with an illustrative example. Data processing system 1900 can be used to implement computer system 212 in FIG. 2 and computer system 312 in FIG. 3.

In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different examples can be performed by processor unit 1904 using computer-implemented instructions, which may be located in a memory, such as memory 1906.

These instructions are referred to as program instructions, computer usable program instructions, or computer-readable program instructions that can be read and executed by a processor in processor unit 1904. The program instructions in the different examples can be embodied on different physical or computer-readable storage media, such as memory 1906 or persistent storage 1908.

Program instructions 1918 are located in a functional form on computer-readable media 1920 that is selectively removable and can be loaded onto or transferred to data processing system 1900 for execution by processor unit 1904. Program instructions 1918 and computer-readable media 1920 form computer program product 1922 in these illustrative examples. In the illustrative example, computer-readable media 1920 is computer-readable storage media 1924.

Computer-readable storage media 1924 is a physical or tangible storage device used to store program instructions 1918 rather than a medium that propagates or transmits program instructions 1918. Computer-readable storage media 1924 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAN), a read-only memory (ROM), an erasable programmable read-only memory (EPROM or Flash memory), a static random access memory (SPA), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1924, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1918 can be transferred to data processing system 1900 using a computer-readable signal media. The computer-readable signal media are signals and can be, for example, a propagated data signal containing program instructions 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program instructions 1918 can be located in computer-readable media 1920 in the form of a single storage device or system. In another example, program instructions 1918 can be located in computer-readable media 1920 that is distributed in multiple data processing systems. In other words, some instructions in program instructions 1918 can be located in one data processing system while other instructions in program instructions 1918 can be located in another data processing system. For example, a portion of program instructions 1918 can be located in computer-readable media 1920 in a server computer while another portion of program instructions 1918 can be located in computer-readable media 1920 located in a set of client computers.

The different components illustrated for data processing system 1900 are not meant to provide architectural limitations to the manner in which different examples can be implemented. In some illustrative examples, one or more of the components may be incorporated in or otherwise form a portion of, another component. For example, memory 1906, or portions thereof, may be incorporated in processor unit 1904 in some illustrative examples. The different illustrative examples can be implemented in a data processing system including components in addition to or in place of those illustrated for data processing system 1900. Other components shown in FIG. 19 can be varied from the illustrative examples shown. The different examples can be implemented using any hardware device or system capable of running program instructions 1918.

Some features of the illustrative examples for pointing an electromagnetic beam are described in the following clauses. These clauses are examples of features and are not intended to limit other illustrative examples.

Clause 1

A laser beam transmission system comprising:

a laser beam system configured to transmit a laser beam;

a controller configured to control the laser beam system to:

direct the laser beam at a location nearest to a maximum of an uncertainty area in which a satellite is expected to be located;

move the laser beam from the location to a next location nearest to the maximum of the uncertainty area in response to not receiving a confirmation that the satellite is at the location, wherein the next location becomes a current location for the laser beam; and continue to move the laser beam from the current location to the next location nearest to the maximum of the uncertainty area from the current location in response to not receiving the confirmation that the satellite has received the laser beam.

Clause 2

The laser beam transmission system of clause 1, wherein a movement of the laser beam is in a form of a nearest to maximum hexagonal scan.

Clause 3

The laser beam transmission system of clause 1, wherein in continuing to move the laser beam, the controller is configured to:

continue to move the laser beam from the current location to the next location nearest to the maximum of the uncertainty area from the current location with a dwell time at each location in response to not receiving the confirmation that the satellite has received the laser beam.

Clause 4

The laser beam transmission system of clause 1, wherein in continuing to move the laser beam, the controller is configured to:

continue to move the laser beam from the current location to the next location nearest to the maximum of the uncertainty area from the current location with a continuous movement from one location to another location in response to not receiving the confirmation that the satellite has received the laser beam.

Clause 5

The laser beam transmission system of clause 1, wherein the controller is configured to control the laser beam system to:

move the laser beam to a neighbor location of a nearest neighbor in response to a time for moving the laser beam from the current location to the next location using the location nearest to the maximum of the uncertainty area being greater than a threshold, wherein the next location becomes the current location; and continue to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

Clause 6

The laser beam transmission system of clause 5, wherein in moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Clause 7

The laser beam transmission system of clause 1, wherein the controller is configured to:

establish communications with the satellite in response to receiving the confirmation.

Clause 8

The laser beam transmission system of clause 7, wherein the communications are selected from one of unidirectional communications and bidirectional communications.

Clause 9

The laser beam transmission system of clause 1, wherein the laser beam is selected from a group comprising a continuous laser beam and a pulsed laser beam.

Clause 10

An electromagnetic beam transmission system comprising:

an electromagnetic beam system configured to transmit an electromagnetic beam;

a controller configured to control the electromagnetic beam transmission system to:

direct the electromagnetic beam at a location nearest to a maximum of an uncertainty area in which an object is expected to be located;

move the electromagnetic beam from the location to a next location nearest to the maximum of the uncertainty area in response to not receiving a confirmation that the object is at the location, wherein the next location becomes a current location for the electromagnetic beam; and continue to move the electromagnetic beam from the current location to the next location nearest to the maximum of the uncertainty area from the current location in response to not receiving the confirmation that the electromagnetic beam has encountered the object.

Clause 11

The electromagnetic beam transmission system of clause 10, wherein the object is selected from a group comprising an uncooperative object, a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and an electromagnetic beam receiver.

Clause 12. An electromagnetic beam transmission system comprising:

an electromagnetic beam system configured to transmit an electromagnetic beam;

a controller configured to control the electromagnetic beam transmission system to:

direct the electromagnetic beam to a location in an uncertainty area using a scan metric, wherein the uncertainty area is one in which an object is expected to be located;

move the electromagnetic beam from the location to a next location using the scan metric in response to not receiving a confirmation that the object is at the location, wherein the next location becomes a current location for the electromagnetic beam; and continue to move the electromagnetic beam from the current location to the next location using the scan metric in response to not receiving the confirmation that the electromagnetic beam has encountered the object.

Clause 13

The electromagnetic beam transmission system of clause 12, wherein the controller selects the next location in the uncertainty area from a set of candidate locations that has a highest value for the scan metric, wherein the scan metric is as follows:

$$M = PDFint/ttot$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from the current location to the next potential location, and $t_{dwell}$ is a time the line of site dwells at the next potential location.

Clause 14

A method for pointing a laser beam, the method comprising:

directing the laser beam at a location nearest to a maximum of an uncertainty area in which a satellite is expected to be located;

moving the laser beam from the location to a next location nearest to the maximum of the uncertainty area in response to not receiving a confirmation that the satellite is at the location, wherein the next location becomes a current location for the laser beam; and continuing to move the laser beam from the current location to the next location nearest to the maximum of the uncertainty area from the current location in response to not receiving the confirmation that the satellite has received the laser beam.

Clause 15

The method of clause 14, wherein a movement of the laser beam is in a form of a nearest to maximum hexagonal scan.

Clause 16

The method of clause 14, wherein continuing to move the laser beam comprises:

continuing to move the laser beam from the current location to the next location nearest to the maximum of the uncertainty area from the current location with a dwell time at each location in response to not receiving the confirmation that the satellite has received the laser beam.

Clause 17

The method of clause 14, wherein continuing to move the laser beam comprises:

continuing to move the laser beam from the current location to the next location nearest to the maximum of the uncertainty area from the current location with a continuous movement from one location to another location in response to not receiving the confirmation that the satellite has received the laser beam.

Clause 18

The method of clause 14 further comprising:

moving the laser beam to a neighbor location of a nearest neighbor in response to a time for moving the laser beam from the current location to the next location using the location nearest to the maximum of the uncertainty area being greater than a threshold, wherein the next location becomes the current location; and continuing to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

Clause 19

The method of clause 18, wherein moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Clause 20

The method of clause 14 further comprising:

establishing communications with the satellite in response to receiving the confirmation.

Clause 21

The method of clause 20, wherein the communications are selected from one of unidirectional communications and bidirectional communications.

Clause 22

The method of clause 14, wherein the laser beam is selected is selected from a group comprising a continuous laser beam and a pulsed laser beam.

Clause 23

A method for pointing an electromagnetic beam, the method comprising:

directing the electromagnetic beam at a location nearest to a maximum of an uncertainty area in which an object is expected to be located;

moving the electromagnetic beam from the location to a next location nearest to the maximum of the uncertainty area in response to not receiving a confirmation that the object is at the location, wherein the next location becomes a current location for the electromagnetic beam; and continuing to move the electromagnetic beam from the current location to the next location nearest to the maximum of the uncertainty area from the current location in response to not receiving the confirmation that the electromagnetic beam has encountered the object.

With respect to receiving electromagnetic signals, an example of the present disclosure provides an electromagnetic signal receiver system comprising an electromagnetic signal receiver having a field of view in which electromagnetic signals are received and a controller. The controller is configured to control the electromagnetic signal receiver to move the field of view to a location nearest to a maximum of an uncertainty area in which an electromagnetic signal source is expected to be located. The controller is configured to control the electromagnetic signal receiver to move the field of view from the location to a next location nearest to the maximum of the uncertainty area in response to not detecting the electromagnetic signals from the electromagnetic signal source at the location. The next location becomes a current location for the field of view. The controller is configured to control the electromagnetic signal receiver to continue to move the field of view from the current location to the next location nearest to the maximum of the uncertainty area from the current location in response to not detecting the electromagnetic signals from the electromagnetic signal source.

Another example of the present disclosure provides an electromagnetic signal receiver system comprising an electromagnetic signal receiver having a field of view in which electromagnetic signals are received and a controller. The controller is configured to control the electromagnetic signal receiver to move the field of view of the electromagnetic signal receiver to a location in an uncertainty area using a scan metric, wherein the uncertainty area is an area in which an electromagnetic signal source is expected to be located. The controller is configured to control the electromagnetic signal receiver to move the field of view from the location to a next location using the scan metric in response to not detecting the electromagnetic signals from the electromagnetic signal source at the location. The next location becomes a current location for the field of view. The controller is configured to control the electromagnetic signal receiver to continue to move the field of view from the current location to the next location using the scan metric in response to not detecting the electromagnetic signals from the electromagnetic signal source.

Yet another example of the present disclosure provides a method for receiving electromagnetic signals. A field of view of an electromagnetic signal receiver is moved to a location nearest to a maximum of an uncertainty area in which an electromagnetic signal source is expected to be located. The field of view is moved from the location to a next location nearest to the maximum of the uncertainty area in response to not detecting the electromagnetic signals from the electromagnetic signal source at the location. The next location becomes a current location for the field of view. The field of view is continued to be moved from the current location to the next location nearest to the maximum of the uncertainty area from the current location in response to not detecting the electromagnetic signals from the electromagnetic signal source.

Some features of the illustrative examples for receiving electromagnetic signals are described in the following clauses. These clauses are examples of features and are not intended to limit other illustrative examples.

Clause 1

An electromagnetic signal receiver system comprising:

an electromagnetic signal receiver having a field of view in which electromagnetic signals are received;

a controller configured to control the electromagnetic signal receiver to:

move the field of view to a location nearest to a maximum of an uncertainty area in which an electromagnetic signal source is expected to be located;

move the field of view from the location to a next location nearest to the maximum of the uncertainty area in response to not detecting the electromagnetic signals from the electromagnetic signal source at the location, wherein the next location becomes a current location for the field of view; and continue to move the field of view from the current location to the next location nearest to the maximum of the uncertainty area from the current location in response to not detecting the electromagnetic signals from the electromagnetic signal source.

Clause 2

The electromagnetic signal receiver system of clause 1, wherein a movement of the field of view is in a form of a nearest to maximum hexagonal scan.

Clause 3

The electromagnetic signal receiver system of clause 1, wherein in continuing to move the field of view, the controller is configured to:

continue to move the field of view from the current location to the next location nearest to the maximum of the uncertainty area from the current location with a dwell time at each location in response to not detecting the electromagnetic signals from the electromagnetic signal source.

Clause 4

The electromagnetic signal receiver system of clause 1, wherein in continuing to move the field of view, the controller is configured to:

continue to move the field of view from the current location to the next location nearest to the maximum of the uncertainty area from the current location with a continuous movement from one location to another location in response to not detecting the electromagnetic signals from the electromagnetic signal source.

Clause 5

The electromagnetic signal receiver system of clause 1, wherein the controller is configured to control the electromagnetic signal receiver system to:

move the field of view to a neighbor location of a nearest neighbor in response to a time for moving the field of view from the current location to the next location using the location nearest to the maximum of the uncertainty area being greater than a threshold, wherein the next location becomes the current location; and continue to move the field of view from the current location to a subsequent neighbor location of the nearest neighbor from the current location in response to a time for moving the field of view from the current location to the next location using the location nearest to the maximum of the uncertainty area being greater than the threshold and in response to not detecting the electromagnetic signals from the electromagnetic signal source.

Clause 6

The electromagnetic signal receiver system of clause 5, wherein moving the field of view to the neighbor location of the nearest neighbor and continuing to move the field of view from the current location to the subsequent neighbor location of the nearest neighbor from the current location is part of a nearest neighbor scan selected from one of a continuous spiral scan, a step spiral scan, a segmented scan, and a raster scan.

Clause 7

The electromagnetic signal receiver system of clause 1, wherein the controller is configured to:

establish communications with the electromagnetic signal source in response to detecting the electromagnetic signals.

Clause 8

The electromagnetic signal receiver system of clause 7, wherein the communications are selected from one of unidirectional communications and bidirectional communications.

Clause 9

The electromagnetic signal receiver system of clause 1, wherein the controller is configured to:

detect the electromagnetic signals from the electromagnetic signal source in response to detecting selected electromagnetic signals that are greater than a noise level in the field of view.

Clause 10

The electromagnetic signal receiver system of clause 1, wherein the electromagnetic signal receiver is selected from a group comprising a telescope.

Clause 11

The electromagnetic signal receiver system of clause 1, wherein the electromagnetic signals are selected from at least one of a laser beam, a radio frequency beam, a microwave beam, microwave signals, infrared signals, visible light signals, or ultraviolet light signals.

Clause 12

An electromagnetic signal receiver system comprising:

an electromagnetic signal receiver having a field of view in which electromagnetic signals are received;

a controller configured to control the electromagnetic signal receiver to:

move the field of view of the electromagnetic signal receiver to a location in an uncertainty area using a scan metric, wherein the uncertainty area is an area in which an electromagnetic signal source is expected to be located;

move the field of view from the location to a next location using the scan metric in response to not detecting the electromagnetic signals from the electromagnetic signal source at the location, wherein the next location becomes a current location for the field of view; and continue to move the field of view from the current location to the next location using the scan metric in response to not detecting the electromagnetic signals from the electromagnetic signal source.

Clause 13

The electromagnetic signal receiver system of clause 12, wherein the controller selects the next location in the uncertainty area from a set of candidate locations that has a highest value for the scan metric, wherein the scan metric is as follows:

$$M = PDFint/ttot$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from the current location to the next potential location, and $t_{dwell}$ is a time the line of site dwells at the next potential location.

Clause 14

A method for receiving electromagnetic signals comprising:

moving a field of view of an electromagnetic signal receiver to a location nearest to a maximum of an uncertainty area in which an electromagnetic signal source is expected to be located;

moving the field of view from the location to a next location nearest to the maximum of the uncertainty area in response to not detecting the electromagnetic signals from the electromagnetic signal source at the location, wherein the next location becomes a current location for the field of view; and continuing to move the field of view from the current location to the next location nearest to the maximum of the uncertainty area from the current location in response to not detecting the electromagnetic signals from the electromagnetic signal source.

Clause 15

The method of clause 14, wherein a movement of the field of view is in a form of a nearest to maximum hexagonal scan.

Clause 16

The method of clause 14, wherein continuing to move the field of view comprises:

continuing to move the field of view from the current location to the next location nearest to the maximum of the uncertainty area from the current location with a dwell time at each location in response to not detecting the electromagnetic signals from the electromagnetic signal source.

17. The method of claim 14, continuing to move the field of view comprises:

continuing to move the field of view from the current location to the next location nearest to the maximum of the uncertainty area from the current location with a continuous movement from one location to another location in response to not detecting the electromagnetic signals from the electromagnetic signal source.

Clause 18

The method of clause 14 further comprising:

moving the field of view to a neighbor location of a nearest neighbor in response to a time for moving the field of view from the current location to the next location using the location nearest to the maximum of the uncertainty area being greater than a threshold, wherein the next location becomes the current location; and continuing to move the field of view from the current location to a subsequent neighbor location of the nearest neighbor from the current location in response to not detecting the electromagnetic signals from the electromagnetic signal source from the current location to the next location using the location nearest to the maximum of the uncertainty area being greater than the threshold and in response to not detecting the electromagnetic signals from the electromagnetic signal source.

Clause 19

The method of clause 18, wherein moving the field of view to the neighbor location of the nearest neighbor and continuing to move the field of view from the current location to the subsequent neighbor location of the nearest neighbor from the current location is part of a nearest neighbor scan selected from one of a continuous spiral scan, a step spiral scan, a segmented scan, and a raster scan.

Clause 20

The method of clause 14 further comprising:

establishing communications with the electromagnetic signal source in response to detecting the electromagnetic signals.

Clause 21

The method of clause 20 wherein the communications is selected from one of unidirectional communications and bidirectional communications.

Clause 22

The method of clause 14 further comprising:

detecting the electromagnetic signals from the electromagnetic signal source in response to detecting selected electromagnetic signals that are greater than a noise level in the field of view.

Clause 23

The method of clause 14, wherein the electromagnetic signals are selected from at least one of a laser beam, a radio frequency beam, a microwave beam, microwave signals, infrared signals, and ultraviolet light signals.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A laser beam transmission system that comprises:

a laser beam system configured to transmit a laser beam; and a controller configured to control the laser beam system to:

direct the laser beam at a location nearest to a maximum of an uncertainty area in which a satellite is expected to be located;

move the laser beam from the location to a next location nearest to the maximum of the uncertainty area in response to not receiving a confirmation that the satellite is at the location, wherein the next location becomes a current location for the laser beam; and continue to move the laser beam from the current location to the next location nearest to the maximum of the uncertainty area from the current location with a dwell time at each location in response to not receiving the confirmation that the satellite has received the laser beam.

2. The laser beam transmission system of claim 1, wherein a movement of the laser beam is in a form of a nearest to maximum hexagonal scan.

3. The laser beam transmission system of claim 1, wherein the controller is further configured to direct a hybrid scan.

4. The laser beam transmission system of claim 1, wherein in continuing to move the laser beam, the controller is configured to:

continue to move the laser beam from the current location to the next location nearest to the maximum of the uncertainty area from the current location with a continuous movement from one location to another location in response to not receiving the confirmation that the satellite has received the laser beam.

5. The laser beam transmission system of claim 1, wherein the controller is configured to control the laser beam system to:

move the laser beam to a neighbor location of a nearest neighbor in response to a time for moving the laser beam from the current location to the next location using the location nearest to the maximum of the uncertainty area being greater than a threshold, wherein the next location becomes the current location; and continue to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

6. The laser beam transmission system of claim 5, wherein in moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

7. The laser beam transmission system of claim 1, wherein the controller is configured to:

establish communications with the satellite in response to receiving the confirmation.

8. The laser beam transmission system of claim 7, wherein the communications are selected from one of unidirectional communications and bidirectional communications.

9. The laser beam transmission system of claim 1, wherein the laser beam is selected from a group comprising a continuous laser beam and a pulsed laser beam.

10. An electromagnetic beam transmission system that comprises:

an electromagnetic beam system configured to transmit an electromagnetic beam; and a controller configured to control the electromagnetic beam transmission system to:

direct the electromagnetic beam at a location nearest to a maximum of an uncertainty area in which an object is expected to be located;

move the electromagnetic beam from the location to a next location nearest to the maximum of the uncertainty area in response to not receiving a confirmation that the object is at the location, wherein the next location becomes a current location for the electromagnetic beam;

continue to move the electromagnetic beam from the current location to the next location nearest to the maximum of the uncertainty area from the current location with a dwell time at each location in response to not receiving the confirmation that a satellite has received the laser beam; and continue to move the electromagnetic beam from the current location to the next location nearest to the maximum of the uncertainty area from the current location in response to not receiving the confirmation that the electromagnetic beam has encountered the object.

11. The electromagnetic beam transmission system of claim 10, wherein the object is selected from a group comprising an uncooperative object, a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and an electromagnetic beam receiver.

12. An electromagnetic beam transmission system that comprises:

an electromagnetic beam system configured to transmit an electromagnetic beam; and a controller configured to control the electromagnetic beam transmission system to:

direct the electromagnetic beam to a location in an uncertainty area using a scan metric, wherein the uncertainty area is one in which an object is expected to be located;

move the electromagnetic beam from the location to a next location using the scan metric in response to not receiving a confirmation that the object is at the location, wherein;

the controller selects the next location in the uncertainty area from a set of candidate locations that has a highest value for the scan metric, wherein the scan metric is as follows: $M=PDF_{int}/t_{tot}$ where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from a current location to the next potential location, and $td_{well}$ is a time the line of site dwells at the next potential location; and the next location becomes a current location for the electromagnetic beam; and continue to move the electromagnetic beam from the current location to the next location using the scan metric in response to not receiving the confirmation that the electromagnetic beam has encountered the object.

13. The electromagnetic beam transmission system of claim 12, wherein the controller is further configured to direct a hybrid scan.

14. A method for pointing a laser beam, the method comprising:

directing the laser beam at a location nearest to a maximum of an uncertainty area in which a satellite is expected to be located;

moving the laser beam from the location to a next location nearest to the maximum of the uncertainty area in response to not receiving a confirmation that the satellite is at the location, wherein the next location becomes a current location for the laser beam; and continuing to move the laser beam from the current location to the next location nearest to the maximum of the uncertainty area from the current location with a dwell time at each location in response to not receiving the confirmation that the satellite has received the laser beam.

15. The method of claim 14, wherein a movement of the laser beam is in a form of a nearest to maximum hexagonal scan.

16. The method of claim 14, wherein a controller is configured to direct a hybrid scan.

17. The method of claim 14, wherein continuing to move the laser beam comprises:

continuing to move the laser beam from the current location to the next location nearest to the maximum of the uncertainty area from the current location with a continuous movement from one location to another location in response to not receiving the confirmation that the satellite has received the laser beam.

18. The method of claim 14 further comprising:

moving the laser beam to a neighbor location of a nearest neighbor in response to a time for moving the laser beam from the current location to the next location using the location nearest to the maximum of the uncertainty area being greater than a threshold, wherein the next location becomes the current location; and continuing to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

19. The method of claim 18, wherein moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

20. The method of claim 14 further comprising:

establishing communications with the satellite in response to receiving the confirmation.

21. The method of claim 20, wherein the communications are selected from one of unidirectional communications and bidirectional communications.

22. The method of claim 14, wherein the laser beam is selected is selected from a group comprising a continuous laser beam and a pulsed laser beam.

23. A method for pointing an electromagnetic beam, the method comprising:

directing the electromagnetic beam at a location nearest to a maximum of an uncertainty area in which an object is expected to be located;

moving the electromagnetic beam from the location to a next location nearest to the maximum of the uncertainty area in response to not receiving a confirmation that the object is at the location, wherein the next location becomes a current location for the electromagnetic beam;

continue to move the electromagnetic beam from the current location to the next location nearest to the maximum of the uncertainty area from the current location with a dwell time at each location in response to not receiving the confirmation that a satellite has received the laser beam; and continuing to move the electromagnetic beam from the current location to the next location nearest to the maximum of the uncertainty area from the current location in response to not receiving the confirmation that the electromagnetic beam has encountered the object.

* * * * *